(12) United States Patent
Bhansali et al.

(10) Patent No.: US 11,968,196 B2
(45) Date of Patent: Apr. 23, 2024

(54) INTEGRATED CYBERSECURITY SYSTEM AND METHOD FOR PROVIDING RESTRICTED CLIENT ACCESS TO A WEBSITE

(71) Applicant: Softex, Inc., Austin, TX (US)

(72) Inventors: Apurva M. Bhansali, Austin, TX (US); Kamal M. Dhanani, Round Rock, TX (US); Srinivasapriya Kadalagere, Cedar Park, TX (US); Purav Pipalia, Mumbai (IN); Shashikant D. Shinde, Mumbai (IN); Amit S. Ghuge, Mumbai (IN); Pradeep R. Pathak, Thane West (IN); Nirav Zaveri, Mumbai (IN); Lingasvaran Nadar, Mumbai (IN); Vishal Gandhi, Mumbai (IN)

(73) Assignee: Softex, Inc., Austin, TX (US)

( * ) Notice: Subject to any disclaimer, the term of this patent is extended or adjusted under 35 U.S.C. 154(b) by 0 days.

(21) Appl. No.: 17/834,742

(22) Filed: Jun. 7, 2022

(65) Prior Publication Data
US 2022/0303257 A1 Sep. 22, 2022

Related U.S. Application Data

(62) Division of application No. 15/981,868, filed on May 16, 2018, now Pat. No. 11,388,155.
(Continued)

(51) Int. Cl.
*H04L 9/40* (2022.01)
*G06F 21/32* (2013.01)
(Continued)

(52) U.S. Cl.
CPC .............. *H04L 63/08* (2013.01); *G06F 21/32* (2013.01); *G06F 21/45* (2013.01); *H04L 9/3231* (2013.01);
(Continued)

(58) Field of Classification Search
CPC ... H04L 63/08; H04L 9/3231; H04L 63/0876; H04L 63/102; G06F 21/32; G06F 21/45; G06F 16/23
(Continued)

(56) References Cited

U.S. PATENT DOCUMENTS

| | | | |
|---|---|---|---|
| 2005/0246191 A1* | 11/2005 | Lux | G06Q 30/0601 705/26.1 |
| 2013/0104203 A1* | 4/2013 | Davis | G06F 21/316 726/5 |
| 2016/0005038 A1* | 1/2016 | Kamal | G06Q 20/3223 705/44 |

FOREIGN PATENT DOCUMENTS

| | | | | |
|---|---|---|---|---|
| KR | 20090000093 A | * | 1/2009 | ............. H04L 67/02 |

* cited by examiner

*Primary Examiner* — Jacob Lipman
(74) *Attorney, Agent, or Firm* — G+J Law Group PLLC; Georgios A. Georgakis

(57) ABSTRACT

Integrated cybersecurity systems and method for providing client access to a website. The methods involve receiving website configuration information for the client access; receiving client enrollment data for the client access; receiving client input data from a client; defining integrated client confirmation; and providing the website with the client identification information based on the integrated client confirmation. The defining involves authenticating the client input data by comparing the client input data with the client enrollment data; authorizing the authenticated client by determining client authorization information associated with the client enrollment data based on the website configuration information; identifying the authenticated client by determining client identification information associated with the client enrollment data; and providing the website with the client identification information based on the integrated client confirmation. The website is isolated from the client
(Continued)

enrollment data, the client input data, and the defining of the integrated client confirmation.

8 Claims, 22 Drawing Sheets

Related U.S. Application Data

(60) Provisional application No. 62/507,036, filed on May 16, 2017.

(51) Int. Cl.
 *G06F 21/45* (2013.01)
 *H04L 9/32* (2006.01)
 *G06F 16/23* (2019.01)

(52) U.S. Cl.
 CPC ........ *H04L 63/0876* (2013.01); *H04L 63/102* (2013.01); *G06F 16/23* (2019.01)

(58) Field of Classification Search
 USPC ........................................................ 713/186
 See application file for complete search history.

INTEGRATED CYBERSECURITY SYSTEM AND METHOD FOR PROVIDING RESTRICTED CLIENT ACCESS TO A WEBSITE

A. CROSS REFERENCE TO RELATED APPLICATIONS

This application claims the benefit of the filing date of U.S. patent application Ser. No. 15/981,868, filed on 16 May 2018, the entire contents of which is hereby incorporated by reference herein.

The Ser. No. 15/981,868 application claims the benefit of the filing date of U.S. Provisional Patent Application No. 62/507,036, filed on May 16, 2017, the entire contents of which is hereby incorporated by reference herein.

B. BACKGROUND

The present disclosure relates generally to identity authentication techniques. More particularly, the disclosure relates to systems and methods for identity authentication, authorization, and information access management.

Conventional security techniques for protecting data in the information age typically entail some type of user authentication before access is given to restricted information. A common authentication technique uses individual passwords to identify a user and grant access to protected information. Password manager systems utilize software that stores and uses a password, or hash of the password, in a database for authentication purposes.

A need remains for techniques to identity and authenticate entities, and to manage information access across communication networks. The invention relates generally to energy storage systems and more particularly to particle flow batteries.

C. SUMMARY

In at least one aspect, the disclosure relates to an integrated cybersecurity method for providing client access to a website. The method comprises: receiving website configuration information for the client access; receiving client enrollment data for the client access; receiving client input data from a client; defining integrated client confirmation; and providing the website with the client identification information based on the integrated client confirmation. The defining comprises authenticating the client input data by comparing the client input data with the client enrollment data; authorizing the authenticated client by determining client authorization information associated with the client enrollment data based on the website configuration information; and identifying the authorized client by determining client identification information associated with the client enrollment data The website is isolated from the client enrollment data, the client input data, and the defining of the integrated client confirmation.

In another aspect, the disclosure relates to an integrated cybersecurity method for providing client access to a website. The method comprises providing, from a computer server, a first unique identifier to a client; receiving, at the computer server, a second unique identifier from the client, the second unique identifier having been encrypted; decrypting, at the computer server, the encrypted second unique identifier to determine if the encrypted second unique identifier matches the provided first unique identifier; and issuing, by the computer server, an authentication result based on the determination. The second unique identifier is uniquely associated with a user of the client. Prior to receipt of the second unique identifier at the computer server, the second unique identifier has been (i) submitted to a verification device to verify an identity of the user and (ii) encrypted. The verification device is local to the client and the verification is performed locally to the client without interacting with the computer server.

Finally, in another aspect, the disclosure relates to an integrated cybersecurity system for providing restricted client access to a website. The system comprises a security database and a gateway. The security database is communicatively coupled to a client device via a client communication link to pass client data therebetween. The security database is communicatively coupled to the website via a website communication link to pass secure information therebetween. The client device is communicatively coupled to authentication hardware to receive client input from a client. The client data comprises the client input and client enrollment information. The secure information comprises information from or associated with the client data. The gateway comprises a user interface accessible by a gateway operator to configure client settings, a website module accessible by a website operator to configure website settings, and a services module that works in concert with the user interface, the website module, and the security database to provide integrated client confirmation comprising authentication, authorization, and identification of the client, whereby the website is notified to permit selective access to the website by the client.

The present disclosure also relates to other aspects:

According to an aspect, there is provided a method, including the following operations: providing, from a computer server, an authentication subject a unique identifier as a challenge; the authentication subject verifying its identity via a local device using an input uniquely associated to the authentication subject; encrypting the unique identifier provided to the authentication subject; sending the server the encrypted unique identifier; and decrypting, at the server, the encrypted unique identifier to determine a match with the provided unique identifier to issue an authentication result.

The local device comprises one of a biometric reader or a mobile device.

According to another aspect, there is provided a method, including the following operations: authenticating an authentication subject using a unique identifier issued to the subject by a computer server; prompting the authentication subject for consent to send information associated with the authentication subject to another party; and via the server, sending information associated with the authentication subject to the other party upon consent from the authentication subject.

The authenticating comprises prompting the authentication subject to identify itself via a local device using an input uniquely associated to the subject. The other party is a website.

According to another aspect, there is provided a method for performing a transaction on a website, including the following operations: a website user accessing a website; the website requesting for another party to authenticate the user; and the website user consenting to the other party sending the site user's information to the website upon authentication of the user by the other party.

The authentication of the user comprises verification of a unique identifier issued to the user. The authentication of the user comprises identification of the user via a local device using an input uniquely associated to the user.

According to another aspect, there is provided a system comprising a server configured to issue a unique identifier as a challenge to an authentication subject; and a processor configured to encrypt the unique identifier issued to the authentication subject upon verification of the identity of the subject via a local device. The server is configured to decrypt the encrypted unique identifier to determine a match with the issued unique identifier to issue an authentication result.

The local device comprises one of a biometric reader or a mobile device.

According to another aspect, there is provided a system comprising a computer server configured to authenticate an authentication subject using a unique identifier issued to the subject; the server configured to prompt the authentication subject for consent to send information associated with the authentication subject to another party; and the server configured to send information associated to the authentication subject to the other party upon consent from the authentication subject.

According to another aspect, there is provided a method comprising the following operations: attaining a biometric input from an authentication subject at a first location; matching the attained biometric input with a stored biometric input sample to produce a match result; and sending information, based on the match result, to a second location via a communication network.

According to another aspect, there is provided a system comprising a first microprocessor configured with instructions to match a biometric input from an authentication subject with a stored biometric input sample to produce a match result; and the first microprocessor configured to send information, based on the match result, to a second microprocessor linked in a communication network with the first microprocessor. The information sent from the first microprocessor includes a unique identifier associated with the authentication subject.

According to another aspect, there is provided a method comprising the following operations: sending a request from a first website to a second website to authenticate an authentication subject; authenticating the authentication subject at the second website based on input from the authentication subject, wherein the authenticating step is performed without use of a password; and sending an authentication result from the second website to the first website.

According to another aspect, there is provided a method comprising the following operations: communicating with a computer server via a communication network to carry out a client authentication procedure; receiving an authentication result from the server via the communication network; and carrying out a transaction with the client based on the received authentication result.

According to another aspect, there is provided a method for logging into a website, comprising providing a biometric input at a local device; and consenting to an information exchange between a website to be logged into and a computer server linked in a communication network with the website. Login to the website is achieved via the information exchange between the website and the computer server.

According to another aspect, there is provided a method for establishing a login capability for a website, comprising: enrolling a website with a computer server in a communication network; establishing an information record, at the computer server, for a user of the enrolled website; authenticating, via the computer server, the user of the website based on information in the information record established for the user; and confirming authentication of the user between the website and the computer server to login the user on the website.

According to another aspect, there is provided a method for granting a user access at a software portal, comprising: verifying the identity of a user using an input uniquely associated with the user; sending an authentication result to the software portal; and the software portal granting the user access based on verification of the identity of the user. Identification of the user is performed by a computer server linked in a communication network with the software portal.

Finally, according to another aspect, there is provided a method for one-click checkout from a website, comprising: a website user providing an input uniquely associated with the user; the website communicating with a computer server via a communication network to carry out authentication of the website user; and the website user consenting to an information exchange between the website and the computer server. Consenting comprises a one-click step by the website user that triggers a checkout function at the website.

The disclosure provides, among other things: techniques for cloud-based or on-premise identity authentication via communication networks, systems and methods providing strong identity authentication and access management for integration with web, client, and mobile apps, and techniques for one-click authentication and checkout without the use of passwords.

This summary provides possible aspects of the disclosure, is not intended to be limiting.

D. BRIEF DESCRIPTION OF THE DRAWINGS

Other objects and advantages of the invention may become apparent upon reading the detailed description and upon reference to the accompanying drawings.

Figure 1:
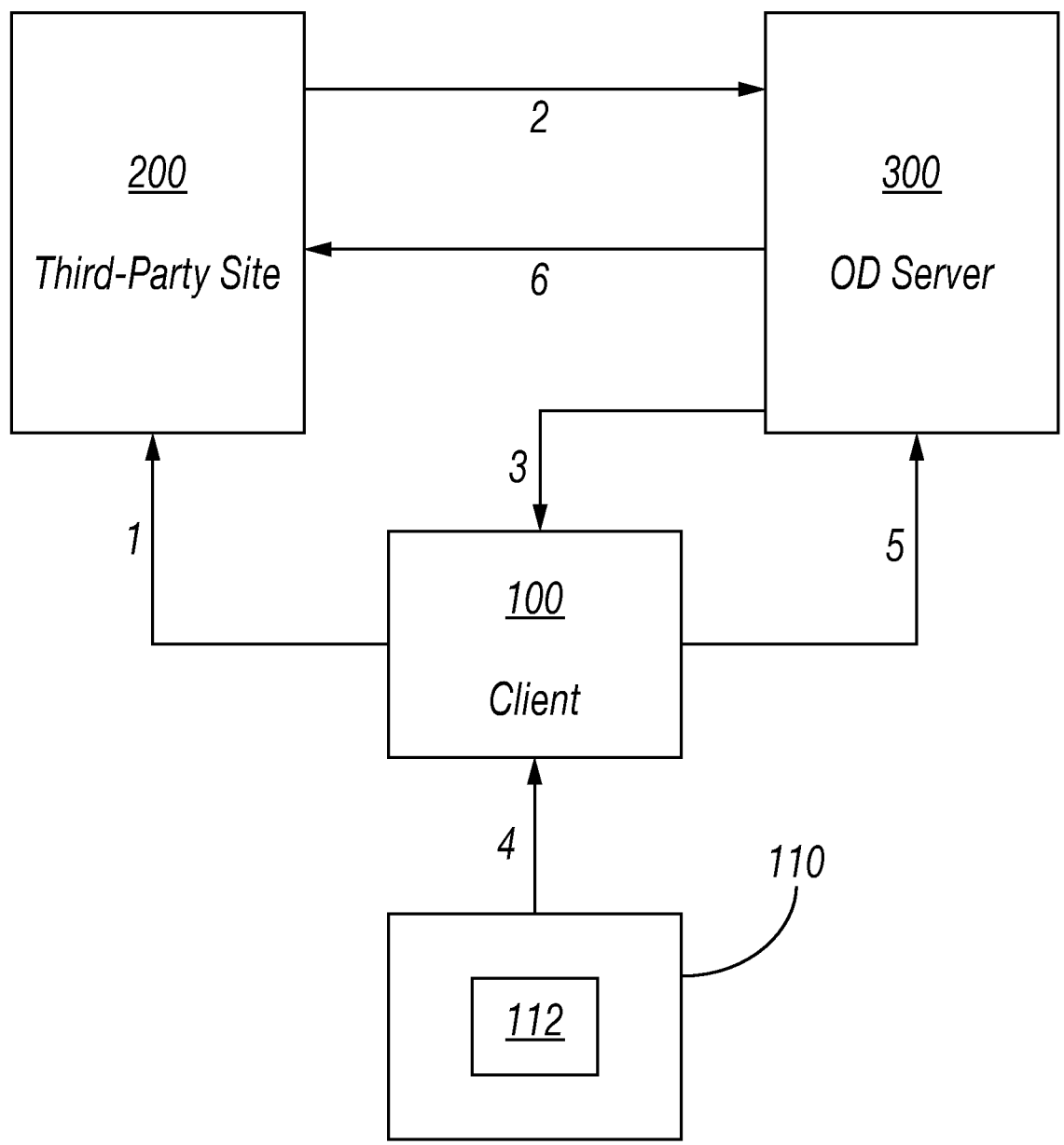
FIG. 1 depicts a schematic drawing of an exemplary implementation for authenticating a subject according to some embodiments of the disclosure.

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

E. DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible. The present disclosure provides communication network (including private networks or via the Internet) users a means for strong identity authentication and information access management using an infrastructure computer server. Systems and methods disclosed herein provide user authentication without the use of a password login process.

These techniques may involve Cloud-based or On-premise identity authentication via communication networks. The systems and methods herein seek to provide strong identity authentication and access management for integration with web, client, and mobile apps. Techniques for one-click authentication and checkout without the use of passwords.

To provide authentication systems with sufficient security, techniques are provided to identify and authenticate entities and manage information access across communication networks. The present disclosure seeks to provide cybersecurity techniques which integrate provision of authentication (verification of user identity), authorization (indication of user role, access rights, etc.), and identification (user identification information) for user access to third-party websites. These techniques may be performed by verifying the user at the user's local device and then sending encrypted unique user identifiers (e.g., biometrics) from the user's local device (client device) to a cybersecurity (or OD) server and without sending the user's information (e.g., passwords, personal data, pin numbers, etc.) to the third-party site.

In this manner, the user's information may be isolated from the third-party sites, thereby limiting available access to the user's information, thereby better protecting the user's information and preventing potential liability to the third-party sites for release of the user's information in the event of a data breach. In the event that the user wishes to send user's information to the third-party site, facilities are provided to send the user's information to the third-party site without storing it at the third-party site. The third-party site may use the security server as a sophisticated security gateway to efficiently and accurately confirm the identification, authentication and authorization of the user remotely from the third-party site, and to store the user information for the third-party site.

1. Cybersecurity Example Systems

Figure 2:
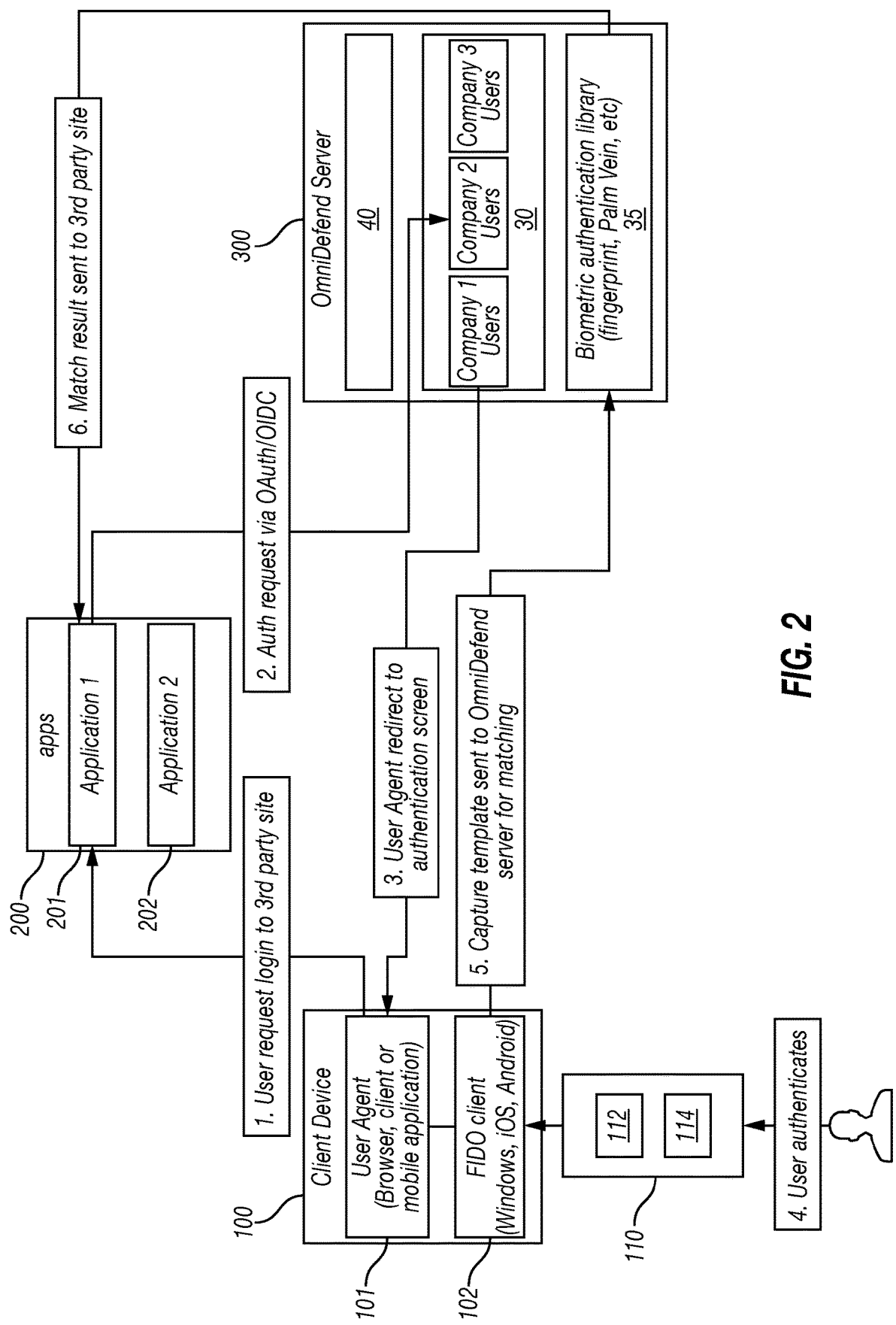
FIG. 2 depicts a schematic drawing of another exemplary implementation for authenticating a subject according to some embodiments of the disclosure.
Figure 3:
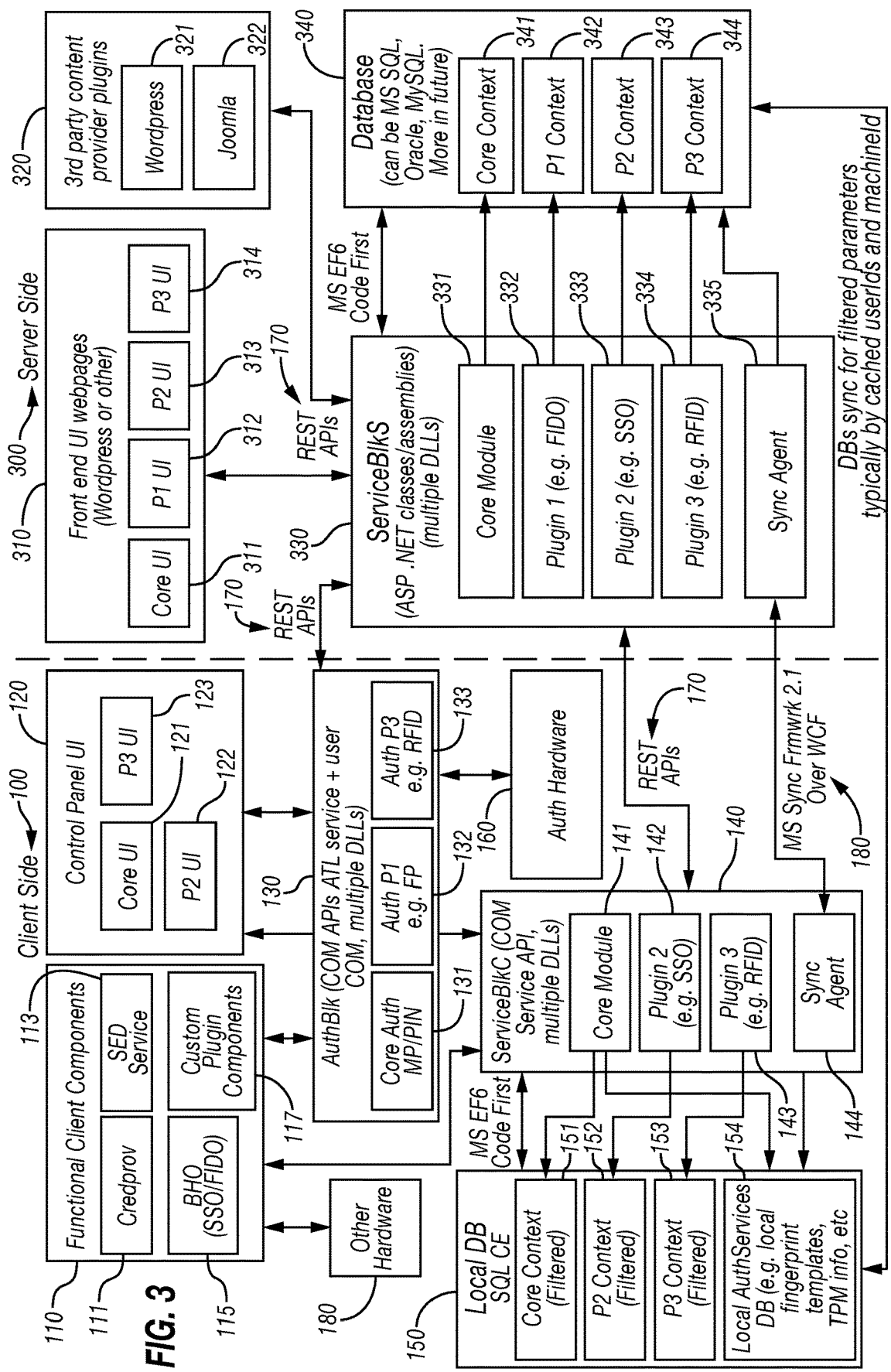
FIG. 3 depicts a schematic drawing of another exemplary implementation for authenticating a subject according to some embodiments of the disclosure.
Figure 4A:
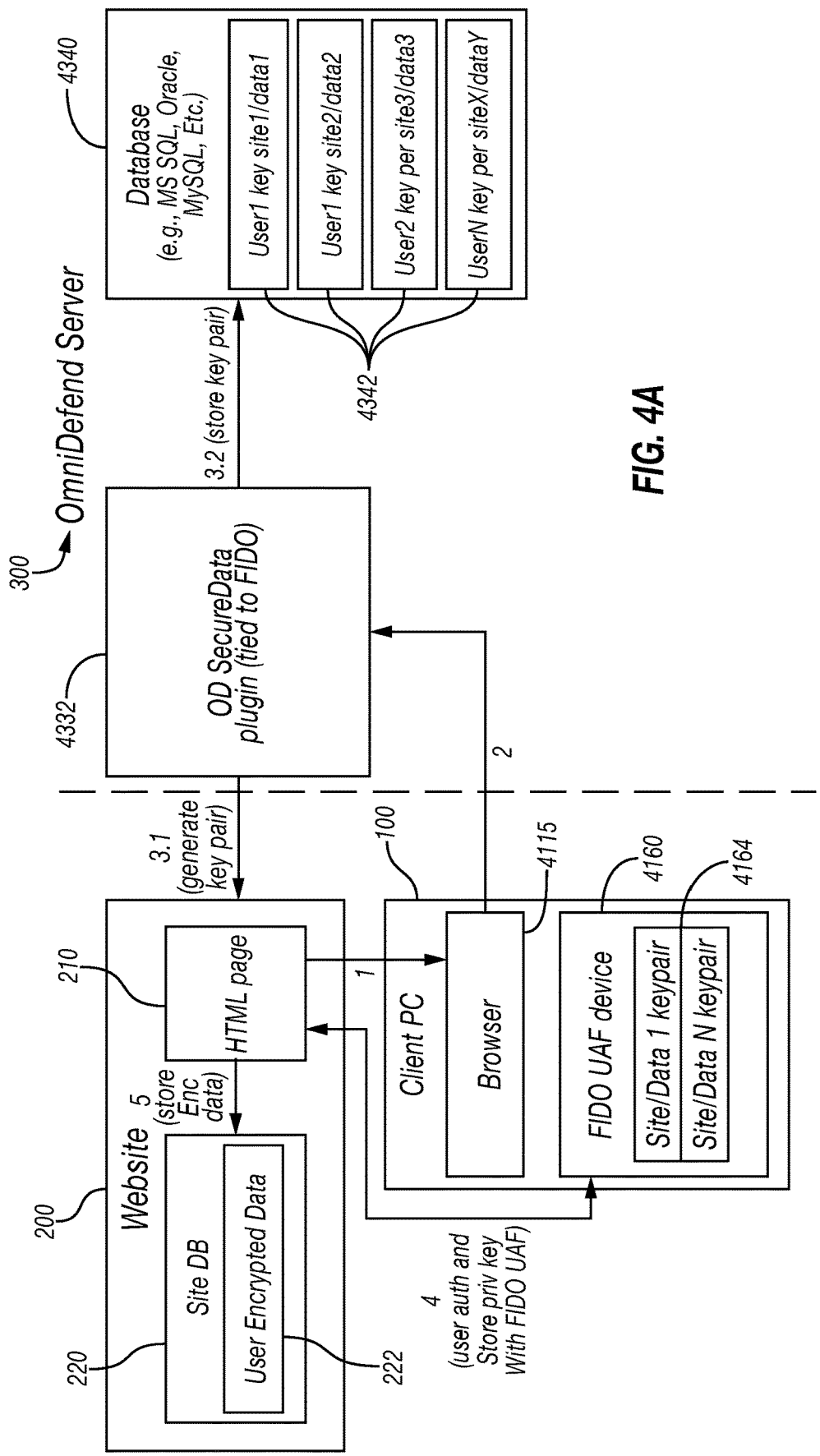
FIG. 4A depicts a schematic drawing of data flow in an implementation according to some embodiments of the disclosure.
Figure 4B:
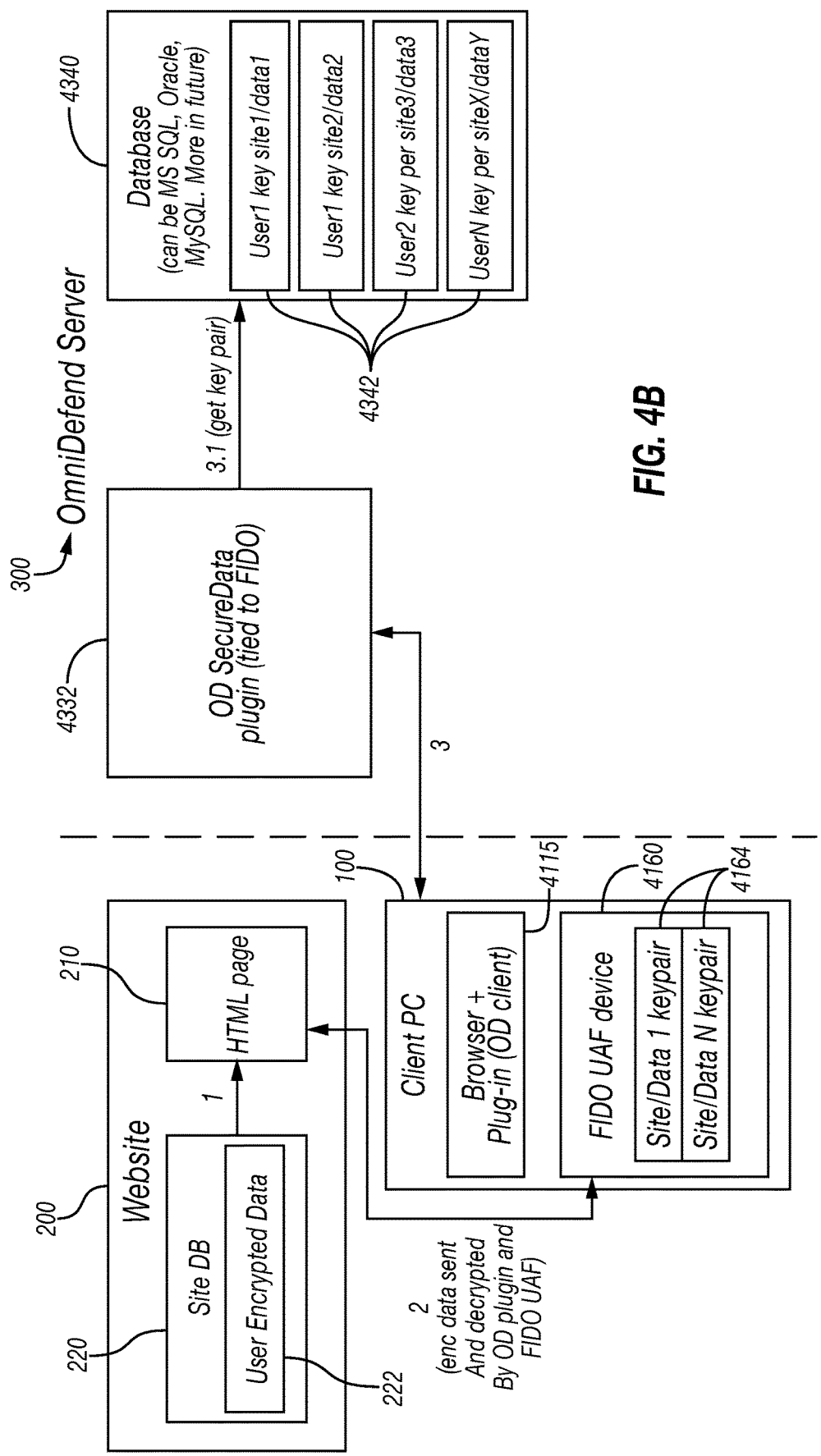
FIG. 4B depicts a schematic drawing of data flow in the implementation of FIG. 4A according to some embodiments of the disclosure.

FIGS. 1-4B depict schematic views of systems and methods according to various configurations described in this disclosure. The systems and methods seek to provide Remote Authentication to identify the user, Remote Authentication to determine user permissions, and Identification of the user to the third-party website. FIGS. 1 and 2 show various views of interaction between a user 100, a third-party site 200, and a server 300. FIG. 3 shows detailed views of the interaction between the user 100 and the server 300. FIGS. 4A and 4B show schematic views of interactions between the third-party site 200 and the server 300.

Referring first to FIG. 1, a client 100 (e.g. a customer via a browser or App on a smart phone) desiring to perform a transaction on a third-party site 200 (e.g., website, software App) interacts with a server 300. Servers are also herein referred to as an "OmniDefend server" or as an "OD server".

At point 1, the client 100 requests to perform a transaction (e.g., login, check out) on the third-party site 200. At point 2, the third-party site 200 communicates with the OD server 300 requesting authentication of the client 100. At point 3, the OD server 300 provides the client 100 a unique identifier as a challenge and prompts the client (e.g., via display of an authentication screen) to verify its identity. In some configurations, the unique identifier is a data component randomly generated by the OD server 300.

At point 4, the client provides an input uniquely associated to the client via a local device 110. The local device 110 can include a biometric reader (e.g., fingerprint reader, retinal scanner, etc.), a computer tablet, a mobile phone, a facial recognition device, or any suitable peripheral device. A processor 112 in local device 110 compares the input provided by the client (e.g. fingerprint) against an input sample (e.g. client's fingerprint previously stored) in memory to locally verify the client's 100 identity.

Upon verification of the client's 100 identity, the unique identifier provided to the client is encrypted locally (e.g., via a programmed processor 112 in the local device 110 or the client's 100 computer or mobile device). At point 5, the encrypted unique identifier is sent to the OD server 300, where it is decrypted to determine if it matches the unique identifier originally provided to the client 100 by the server 300 during enrollment as described further herein. At point 6, once a match is determined by the OD server 300, the server sends an authentication result to the third-party site 200, confirming authentication of the client 100.

Implementation of the system and process described herein provides a client 100 (e.g. a customer) the ability to perform a transaction (e.g., login, checkout) at a third-party site 200 (e.g., a retailer website on the Internet) without the use of a password or other client information. The process of user identification and authentication is handled by the OD server 300, freeing the third-party site 200 from having to store or process any client information.

Upon receiving an affirmative authentication result from the OD server 300, the third-party site 200 can proceed with performance of the transaction with the client 100 (e.g., accepting an order and checking out the client). By freeing the third-party site 200 from having to store the client's 100 personal information for login/authentication, the client's 100 information is protected in the event the third-party site is hacked. From the client's 100 perspective, performing the transaction is greatly simplified since the client only has to provide his/her unique input (e.g. fingerprint) at the local device 110. No passwords, pin numbers, personal data, security questions, and/or other client information is required.

For the OD server 300 to provide the client 100 authentication, an enrollment procedure is carried out. In some configurations, a client 100 initiates enrollment by inputting his/her fingerprint into the local device 110 (e.g., fingerprint reader), which stores the print data locally with the client. The client 100 generates a public-private key pair using conventional encryption software. In addition to providing the OD server 300 the personal identifying information (e.g., name, address, phone number, credit card data, etc.), the client 100 also provides the server his public key from the generated key pair. The client 100 does not release his private key. For added security, the OD server 300 may send the client 100 a secret test identifier to be encrypted by the client using his private key and then sent back to the server, whereupon the identifier is decrypted by the server using the public key it received from the client. In some configurations, the OD server 300 compiles a library or database of the different clients' 100 public keys and personal identifying information.

In some configurations, the client's 100 computer or mobile device is programmed to encrypt, using the client private key, the unique identifier provided by the OD server 300. Upon client 100 identity verification via the input to the local device 110, the client computer or mobile device then sends the encrypted unique identifier to the OD server 300. In this manner, a client 100 enrolled with the OD server 300 only needs to input his fingerprint, or other unique input, into the local device 110 to trigger authentication, in a single step, without using a password.

Configurations implemented for client 100 transactions with third-party 200 retailers on the Internet, for example, can provide added security by prompting the client for consent (e.g. via a consent confirmation screen) for the OD server 300 to provide the authentication result to the retailer site 200. Some configurations can be implemented wherein the notification to the client 100 requesting consent is sent to the client's smart phone. Yet other configurations can be implemented wherein the client 100 provides both a retinal scan and consent via a smart phone. In such configurations, having the phone on your person provides the authentication device for communication with the OD server 300.

Systems and methods according to this disclosure may be implemented using, inter alia, standard industry protocols. For example, the disclosed processes and systems can be implemented using the OAuth 2 authorization framework, which enables applications to obtain access to user accounts on an HTTP service. This framework provides authorization flows for web and desktop applications, and mobile devices. Additional information regarding the OAuth 2 framework may be found at <https://tools.ietf.org/html/rfc6749>. The OAuth 2 framework is herein also referred to as the "Auth" protocol. The OPENID® Connect protocol may also be used in implementing systems and methods according to this disclosure. This identity protocol provides an identity layer on top of the OAuth 2 specification so that digital identities can be used across sites and applications. Additional information regarding the OPENID® Connect protocol may be found at: <https://www.gluu.org/resources/documents/standards/openid-connect/>. The OPENID® connect protocol is herein also referred to as the "OIDC" protocol.

Systems and methods according to this disclosure may be implemented on site and/or in a cloud-based environment. For cloud-based implementations, the System for Cross-domain Identity Management (SCIM) specification may be used to simplify managing client identities. The SCIM specification provides a common user schema with patterns for exchanging this schema using the other standard protocols (providing user information and consent triggers), making it easy to move users around the cloud. Additional information regarding the SCIM specification may be found at <http://www.simplecloud.info/>.

As described herein, some configurations may entail client identity verification via an input to a local device. The client's unique input (e.g. biometric information) can be maintained strictly in the client's device if greater information security is desired. Configurations may be implemented with Fast Identity Online (FIDO®) protocols to protect client privacy. The FIDO® protocols use standard public key cryptography techniques. Additional information regarding the FIDO® specification may be found at: <https://fidoalliance.org/specifications/overview/>. Implementation of these standards in systems and methods of this disclosure may entail incorporation of one or more plugin (also referred to as an extension) software components to the software code used by the client 100, third-party site 200, and/or OD server 300 processors. Suitable plugins are available, for example, via the WordPress® or JOOMLA® content management systems on the Internet. Some website browser providers have started building in their own plugin code for easy implementation of add-on software. It will be appreciated by those skilled in the art that while systems and methods of this disclosure may be implemented using these noted standards, they may also be implemented using custom designed algorithms, and such customized algorithms may use some, or components, of the standards.

FIG. 2 depicts another schematic view of systems and methods according to various configurations described in this disclosure. At point 1, the client 100 requests to perform a transaction on the third-party site 200. The request may be sent by user agent 101 (e.g., browser, client or mobile application) of the client 100 to a first application 201 of third-party site 200. At point 2, the third-party site 200 (first application 201) sends an authentication request (using the Auth & OIDC protocols) to the OD server 300, which locates the client from a client database 30. At point 3, the OD server 300 redirects the client 100 (user agent 101) to an authentication screen.

At point 4, the client 100 provides the input uniquely associated to the client via a local device 110. For example, in a configuration using a fingerprint reader 114, the client 100 simply swipes his fingerprint on the reader. A processor 112 in the local device 110 compares the input provided by the client 100 against an input sample (e.g. client's fingerprint previously stored) in memory to locally verify the client's 100 identity. In some configurations, the client 100 device may be implemented with code comprising the FIDO® protocol.

At point 5, upon local verification of the client's 100 identity, a capture template is sent to the OD server 300 for matching in a library 35 housing client data (e.g. a biometric data library), including enrollment templates. The capture template may be sent via FIDO® client 102 of client 100, which may be configured to operate in a Windows, iOS, Android or other environment. In some configurations, the capture template is created during the authentication process (as opposed to an enrollment template, which is created during the enrollment process). At point 6, a match result is sent from the OD server 300 to the third-party site 200 to confirm authentication, whereupon the client 100 and third-party site 200 can proceed with transactions. The third-party site may include additional applications for various functionality, such as second application 202.

In some configurations, the OD server 300 may be located with and run by the third-party 200 site operator. For example, a company requiring high security measures for its own employees (such as a financial or medical institution) may implement a system such as described in this disclosure within its network for its internal operations. It will be appreciated that such customized configurations may be implemented with variations in the communication and data handling steps described herein.

Some configurations may be implemented wherein the OD server 300 is configured to provide additional information to the third-party site 200 after client 100 authentication is achieved. For example, a repository 40 (see FIG. 2) in the OD server 300 can be populated with each client's 100 personal information (e.g., name, address, credit card data, etc.). With such configurations, a client 100 customer to a third-party site 200 online retailer can be authenticated by the techniques described herein, and the client's 100 personal information can be automatically sent to the retailer when the customer provides his one-click consent. In this manner, the third-party site 200 (e.g. online retailer) does not have to store any customer personal information, reducing the risk of identity theft in the event of a hacking incident.

Turning to FIG. 3, a schematic of systems and methods according to various configurations described in this disclosure is illustrated. The schematic shows components divided between a Client Side (i.e., client 100) and a Server Side (i.e. OD server 300). The Client Side 100 comprises:

Functional Client Components 110—these components present different authentication, endpoint security and identity management related functionalities to the user on electronic device (e.g. personal computer, mobile phone, internet of things (IoT) device, etc.). The Functional Client Components also may include separate installers to install functional components (potentially downloadable from the server). Some examples of these modules on the WINDOWS® 10 operating system include the following:

Device login/lock/unlock protection 111 (e.g. Credential Provider in Windows 10 operating system)—calls the Authentication Client Components 130 (described below) to authenticate a user with the given authentication hardware 160 (e.g., fingerprint reader 114). In addition, this component may communicate with the Service Client Components 140 to manage logon settings and policies and other interaction with the server.

Self Encrypting Disk (SED) management Service 113—components to manage hardware based disk encryption. This component can talk to the Authentication Client Components 130 when needing to authorize a user to view and access encrypted data on a disk. In addition, this component can communicate with the Service Client Components 140 to manage disk encryption settings and policies and other interaction with the server.

Browser extensions 115 (e.g. browser help object (BHO) in Microsoft Internet Explorer)—these components can manage browser related authentication and single sign-on to websites, etc. This component would talk to the Authentication Client Components 130 when needing to authorize a user to fill in their password and grant access to websites, etc. In addition, this component can communicate with the Service Client Components 140 to manage single sign-on settings and password vault entries for a user and interact with the server components to save these profiles on the server.

Custom Plugin Components 117—2 types of plugins (Functional Modules (e.g. single sign-on software (SSO), stream editor (SED), FIDO®, etc.); Functional components may communicate with the Authentication Client components to authorize a user for customized functionality and communicate with the Service Client components 140 to manage settings, profiles, etc., that may be used on the client device and saved on the server.

User Interface (UI) components (Control Panel UI) 120—provides the base user interface where a user can manage functional component user interactions, settings and policies. Each functional client module can provide a plugin to the control panel to present that functional client module's user interface. Accordingly, Control Panel UI 120 may include a core user interface 121, and one or more plugin user interfaces. As an example, FIG. 3 shows two plugin user interfaces 122 and 123. This architecture allows the UI 120 to show UI elements specific for the plugin. For example, a plugin user interface for SSO may show the websites and applications in a user's SSO profile. A plugin user interface for SED may show information about the users that have access to unlock the drive. The UI 120 components could accept input from the user that may affect the operation of the plugin (e.g. changing the password in a user's SSO application profile). In this situation, the changes can be communicated directly to ServiceBlkC 140 which may then use the representational state transfer (REST) application programming interfaces (APIs) 170 to communicate the changes to the server 300 and its ServiceBlkS 330 component which can then effect the change on the server database 340 if required.

Authentication Client Components (AuthBlk) 130—this component provides the user authentication services on the client PC 100. The components include a base module that will load plugin modules for different supported authentication hardware (e.g. fingerprint reader, smart card device, signature recognition hardware, etc.). These authentication client plugin components will typically communicate directly with authentication hardware 160 (e.g. invoke a fingerprint scan on a fingerprint reader), the UI 120 (e.g. displaying the scanned fingerprint on the screen to the user), and the Service Client components 140 to process the authentication of a user and interact with the server 300 as needed in this process (e.g. building the fingerprint template and sending that template to the server 300 for a match). The communication with the server 300 the Service Client components 140 may be conducted via an application program interface (e.g. REST API) 170 or other internet Application Programming Interfaces (API) protocols.

Service Client Components (ServiceBlkC) 140—these components perform the processing on the client electronic device for user authorization, endpoint device management and user identity management. The service client components 140 include a base module that can load plugin modules to perform the processing for each type of functional component. Accordingly, ServiceBlkC 140 may include a core module 141, and one or more plugin modules. As an example, FIG. 3 shows two plugin modules 142 (SSO) and 143 (RFID). In another configuration, ServiceBlkC 140 may include an SSO plugin and a SED plugin. In the case of the SSO plugin, when the user uses the Control Panel UI 120 to update a password in an application SSO profile, the ServiceBlkC 140 may take this new password and update it in the local DB 150 and may also use the REST APIs 170 to communicate this password change to the server 300. Likewise, if a new user is given access to unlock the SED drive via the Control Panel plugin for the SED, then the plugin may communicate this new user information to the ServiceBlkC 140 and to the plugin in for SED and this plugin can communicate with Functional Client Components 110 to push this new user information to the SED drive itself, while the change is also communicated to the Local DB 150 and to the server 300 via the REST API 170. The service client components 140 may interact with the server 300 via an application program interface (e.g. REST API) 170 or other internet API protocols to manage processing that may be performed on the server 300. For example, the functional client component can request the Service Client Component 140 to process a device login request. The Service Client Component 140 can communicate with the Authentication Client Component 130 to prompt the user to swipe his finger on the fingerprint reader. Once the Service Client Component 140 knows which user has authenticated, it can communication with the Local Database 150 to look up that user's login profiles and policies and then inform the functional client components about the user so that the functional client components can actually perform the unlocking of the electronic device as per the user's profile and policies. The Service Client components 140 can also interact with the server 300 in this case to update the user profiles and policies regarding device logon and also to store a log of the specific device unlock event.

Local Database 150—this database is used by the Service Client components 140 to store data for the client electronic device 100 to process the user authentication, authorization and endpoint management functionality. Interaction between Local Database 150 and Service Client components 140 may occur via any type of database connector software such as Microsoft Entity Framework (for example first EF6 using Code First migrations). The service client components 140 can provide a sync agent 144 that synchronizes the database information on the local electronic device 100 with that on the server 300. The synchronization may be performed via any synchronization framework such as Microsoft Sync Framework 2.1 over WCF protocol. The server database 340 may contain many more records than those that are required by a specific client computer. For example, a company may have 1000 employees and the server 300 would contain authentication, authorization and identity information for all 1000 employees. Any given client PC may only need to sync the authentication, authorization and identity information for the few users that actually use that client PC (typically could be only 1 user if the PC is not shared). The client and server databases 150, 340 may be synced for filtered parameters such as cached userIds and machineId The Local Database 150 may contains a subset of the data in the server database 340, and that subset of data may be relevant for the specific client computer. Local Database 150 may include core context (filtered) 151, one or more plugin contexts, such as plugin 2 context (filtered) 152 and plugin 3 context (filtered) 153, and local authservices database 154, which may contain local fingerprint templates, TPM information, etc. For example, if plugin 2 is an SSO plugin then the Local Database may contain SSO context information such as SSO application profiles which may include usernames and passwords. This SSO context information may be filtered in the Local Database so it is limited to SSO application profiles for the user(s) of the client PC and not all of the user application profiles stored in the server 300 which may be for all employees in a company. Likewise, if plugin 3 is an SED plugin, then the Local Database may contain the information about the users that are authorized to unlock the SED on the given PC which would be filtered from the server 300 which may contain the information about every user that is authorized to unlock every SED on every PC in the company. Likewise, the local Authservices Database 154 may contain fingerprint template information only for the users that are authorized to unlock the specific client PC or the TPM keys for the specific client PC which may be a filtered context from the server 300 which would contain every user's fingerprint templates and TPM keys for every machine in the company.

The client side 100 may also include other hardware 180, which may interact with the Functional Client Components 110. For example, the SED Service will interact with a physical SED drive in the client PC to set the user authorization information for that SED drive.

The OD Server Side 300 comprises:

Front end UI webpages 310—These are management webpages that allow the user to configure, setup and manage the OmniDefend server 300 as well as the policies, profiles and settings related to the different functional components 110 and authentication components 130 presented on the client electronic device 100. The webpages can be designed in any web development framework (e.g., MS ASP .NET model view controller (MVC), AngularJs, etc.). Front end UI webpages may include core UI webpage 311 and one or more plugin webpages. As an example, FIG. 3 shows Plugin 1 UI webpage 312, Plugin 2 UI webpage 313, and Plugin 3 UI webpage 314. If, for example, Plugin 1 is an SSO Plugin, then the front end UI webpages 310 could show icons for each of the applications for which the user has a SSO profile. The UI 310 would potentially allow the user to modify the password for any SSO application through the UI 310. If, for example, plugin 2 is an SED plugin, then the UI 310 may show a list of machines on which the user is allowed to unlock the SED encryption and view data.

3rd Party content provider plugins 320—These are plugin components that 3rd party website developers can integrate into their website 200 to connect with specific management capabilities of the OmniDefend server 300. For example, using the example of a pizza shop (discussed below) that has an e-commerce website written in WORDPRESS™ and wants to add fingerprint login to their website. That pizza shop can install the OD third-party provider plugin for WORDPRESS™, and then configure this plugin to modify the login procedure so that their normal website login page is replaced by one provided by the OmniDefend server 300. While FIG. 3 shows 3rd Party provider plugins 320 including WORDPRESS™321 and Joomla 322, alternative and/or additional plugins may be used.

Service Server Components (SeviceBlkS) 330—These components are the peer components on the server side to the Server Client Components 140: core module 331, one or more plugins, and sync agent 335. As an example, FIG. 3 shows three plugins 332, 333, and 334. As another example, there could be two plugin modules such as an SSO plug-in and a SED plugin. In the case of the SSO plugin, when the user uses the Control Panel UI 120 to update a password in an application SSO profile, the ServiceBlkS 330 would provide the back-end code to update a user's SSO profile information in the database 340. Also, the plugin could respond to REST API 170 requests from the peer components on the client side (SSO Plugin in ServiceBlkC 140), and obtain changes made to the SSO profile on the client side, or it can provide all SSO profiles stored for a user on the server 300 back to the client for display in the client UI 120. The Service Server Components 330 interact with the Server Client Components 140 to implement and process the functional component's processing as well as user authentication, endpoint device management and user identity management features. The Service Server Components 330 also interact with the Authentication Client Components 130 (via an application program interface, e.g. REST API 170, or other internet API protocols), Front end UI webpages 310 (via an application program interface, e.g. REST API 170, or other internet API protocols), third-party content provider plugins 320, and Main Server Database 340 (via a database middleware layer such as Microsoft Entity Framework). For example, a fingerprint plugin (not shown) in the ServiceBlkS 330 interacts with the fingerprint plugin 132 in the Authentication Client Components 130 (AuthBlk). When a fingerprint image is captured for user authentication on the client PC, the AuthBlk plugin for fingerprint 132 would send that captured fingerprint template to the ServiceBlkS 330 fingerprint plugin via REST APIs 170. The ServiceBlkS 330 fingerprint plugin component would interact with the Database 340 to match the fingerprint template against those stored in the Database 340. If the match is successful, the identity of the user that has authenticated can be passed to a 3rd party content provider plugin 320 (for example a WORDPRESS® webpage 321) to log the user into that 3rd party website.

Main Server Database 340—This is a database of the OmniDefend server 300 which retains the master copy of all the user policies, profiles, settings as well as any other data required by functional or service components. The main server database 340 may also store all logs regarding user authentication, user identity, user authorization, endpoint security events, policies and settings changes, etc., that may be stored from the OD server 300. Each service server component 330 may log relevant data. For example, core module 331 may store data in core context 341 of Database 340. The core module 331 may store user identity information for all users in the server 300, all information about the companies/organizations that the users are a part of, all information about the server 300 and specific settings of the server 300 and information about authentication and authorization profiles for all the users in the server 300. Likewise, plugins 332-334 may store data in plugin contexts 342-344 of Database 340. For example, if a plugin were a plugin for fingerprint authentication (not shown), then this plugin would store information about the fingerprint templates for all users enrolled in the server 300. While FIG. 3 shows three plugin contexts 342-344 as an example, database 340 may include more or fewer than three plugin contexts. The service client components 140, functional client components 110, and authentication client components 130, may also choose to log information on a Local Database 150 that can be synced up with the Main Database 340, or these client components may communicate via the service server components 330 to have the service server components 330 make the log entries in the main server database 340. The logs may store relevant information about the specific users performing an event, the event being performed, any error conditions that may occur, and the time and date of the event, just to name a few things.

The Authentication Client Components 130 provide the ability to develop plugins for different authentication technologies. These plugins may be of two types, one for a UI that can be run in user context (Core Auth MP/PIN 131) and one for authentication functionality of the plugin that can communicate with the authentication hardware (Auth P1 132, Auth P3 133; though two such plugins are shown, more or fewer than two may be employed). For example, if Auth P1 132 is a fingerprint plugin, then there may be a UI displayed to the user prompting the user to touch or swipe on an attached fingerprint reader (which would be included in Authentication Hardware 160). The UI runs in the user's OS context. This UI could be displayed inside a web browser control used to render the UI prompt. The actual capturing of the fingerprint may need to run in the OS service context so that it can communicate with the hardware to capture the actual fingerprint scan. Once captured this fingerprint image could be displayed in the UI component running in the OS user context.

Authentication plugins may be designed to sign a challenge from the base Authentication Client Components 130 in order to validate user identity. Auto detection and loading support may be used so that all supported authentication plugins can be installed on a system. This auto loading support can also involve automatic download of the authentication plugin from the server 300.

The OD server 300 also provides various Software Development Kits (SDKs) which can allow software applications on various platforms (e.g. WINDOWS® PC, Android and APPLE® mobile phones, LINUX® based IoT devices, etc.). These SDKs give software developers the ability to invoke the functionality of the OD server 300. The SDKs act as a "bridge" between the 3rd party platform 200 application and the OD server 300 and may implement certain functionalities from the functional client components 110, authentication client components 130, and other client side components for the given platform.

FIG. 4A illustrates a secure data flow provided in accordance with some systems and methods described in this disclosure. This configuration may entail the exchange of secret test and unique identifiers for identifying the user as described for other configurations disclosed herein. At point 1, a Website 200 (e.g. an online commercial vendor) requests data from a User/Client 100 (e.g., a customer's credit card number), using an HTML page 210 and browser 4115 of User/Client 100. At point 2, the Website 200 sends data to the OD server 300 (e.g., OD SecureData plugin 4332 tied to FIDO) to protect the information. At point 3.1, the Website 200 requests for the OD server 300 to create a new encrypted key pair and the Website 200 encrypts the data with the public key. At point 3.2, the key pair is stored in the OD server 300 (e.g., database 4340) under the user profile and associated with the specific website request (hence the illustrated format "user1 key site1/data1," etc. of the stored key and associated data 4342).

At point 4, the User/Client 100 authenticates via an authentication device such as a FIDO® Universal Authentication Framework (UAF) device 4160 (e.g., may be via a smart phone, scanner local device, etc., not shown) and then the private key is added to an authentication payload and stored in the User/Client PC along with a website request identifier (hence the illustrated format "Site/Data 1 keypair," etc. of the stored key and associated data 4164).

At point 5, the encrypted data 222 is stored by the Website 200 in its database 220. The Website 200 cannot decrypt the data 222 without the User/Client authentication since the private key is on User/Client PC 100. As shown in FIG. 4B at point 1, when the Website 200 wants to use the User/Client's credit card, the Website 200 first reads the encrypted data 222 from its database 220.

At point 2, the Website HTML page 210 requests user authentication and sends the encrypted data with the request. A browser plugin 4332 provided by the OD server 300 works with a FIDO® UAF device 4160 to decrypt the data after the private key is accessed upon authentication (point 3). If a key pair does not exist in FIDO® UAF 4160 for this site/data element, a key pair is requested from the OD server 300 and added to FIDO® UAF 4160 (point 3.1). The User/Client is required to acknowledge and provide consent (e.g. via assent to proceed) prior to the transfer of data for added protection.

2. Cybersecurity Example Methods

Figure 5:
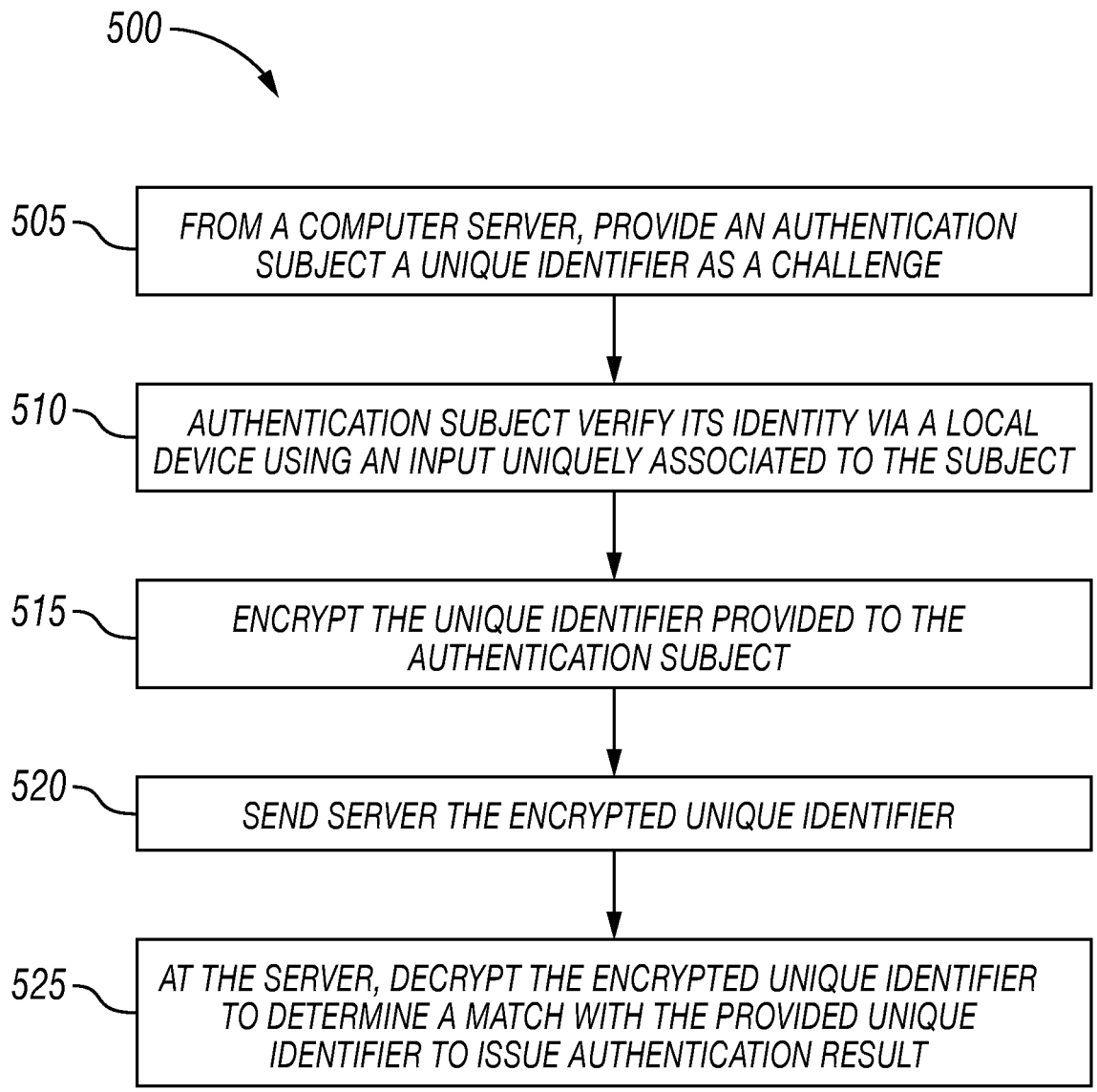
FIG. 5 is a flow chart illustrating, at a top level, a method for authenticating a subject according to some embodiments of the disclosure.

FIGS. 5-14 show various methods of performing identification, authentication, and access. The methods may be performed using the systems of FIGS. 1-4B. Referring first to FIG. 5, a flow chart illustrating a method 500 in accordance with some configurations described in this disclosure is depicted. At block 505, a computer server provides an authentication subject a unique identifier as a challenge. At block 510, the authentication subject verifies its identity via a local device using an input uniquely associated with the authentication subject.

At block 515, the unique identifier provided to the authentication subject is encrypted. At block 520, the encrypted unique identifier is sent to the server, which receives it. At block 525, the encrypted unique identifier is decrypted at the server to determine a match with the provided unique identifier to issue an authentication result.

Figure 6:
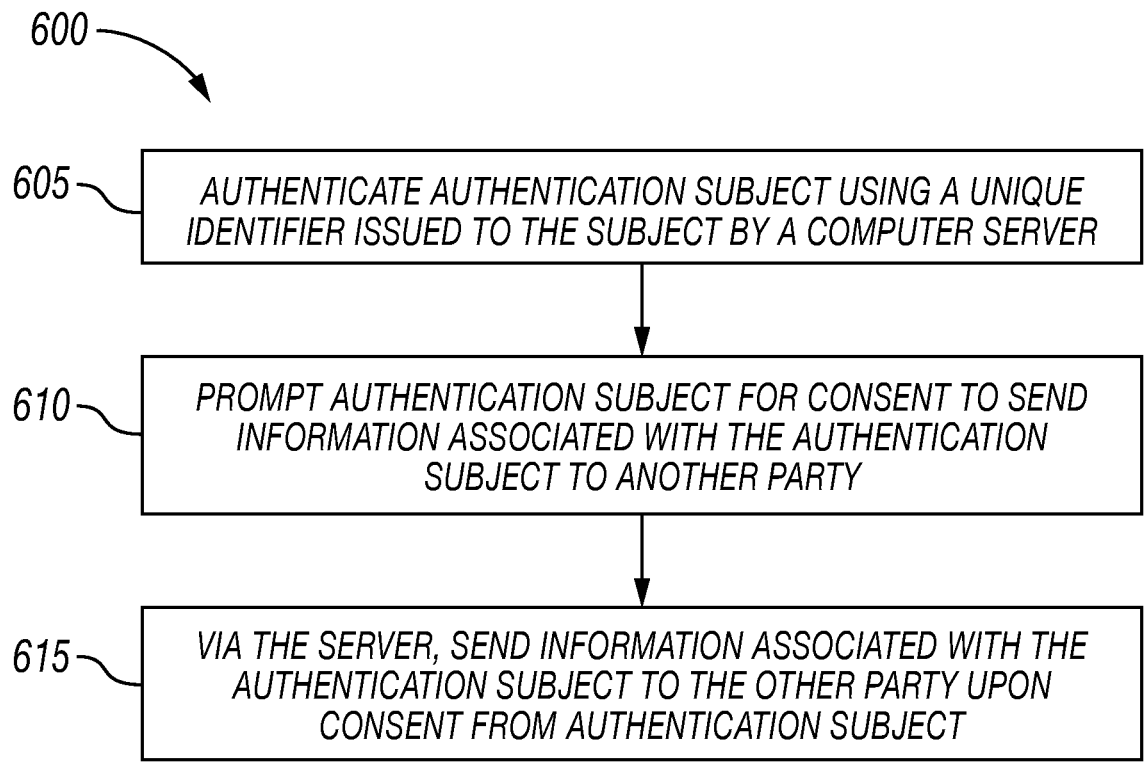
FIG. 6 is a flow chart illustrating, at a top level, another method for authenticating a subject according to some embodiments of the disclosure.

FIG. 6 depicts another flow chart illustrating a method 600 in accordance with some configurations described in this disclosure. At block 605, an authentication subject is authenticated using a unique identifier issued to the subject by a computer server. This may be carried out, for example, as a challenge-authentication procedure by an OD server handling the authentication process for an online vendor.

At block 610, the authentication subject is prompted for consent to send information associated with the authentication subject to another party. (The prompting may be performed, e.g., by the server or the other party.) Assent by the authentication subject provides an added measure of protection.

At block 615, information associated with the authentication subject is sent via the server to the other party (and received by the other party) upon consent from the authentication subject. Continuing with an online vendor example, this information release may include a customer's credit card data, home address, phone number, email address, etc.

Figure 7:
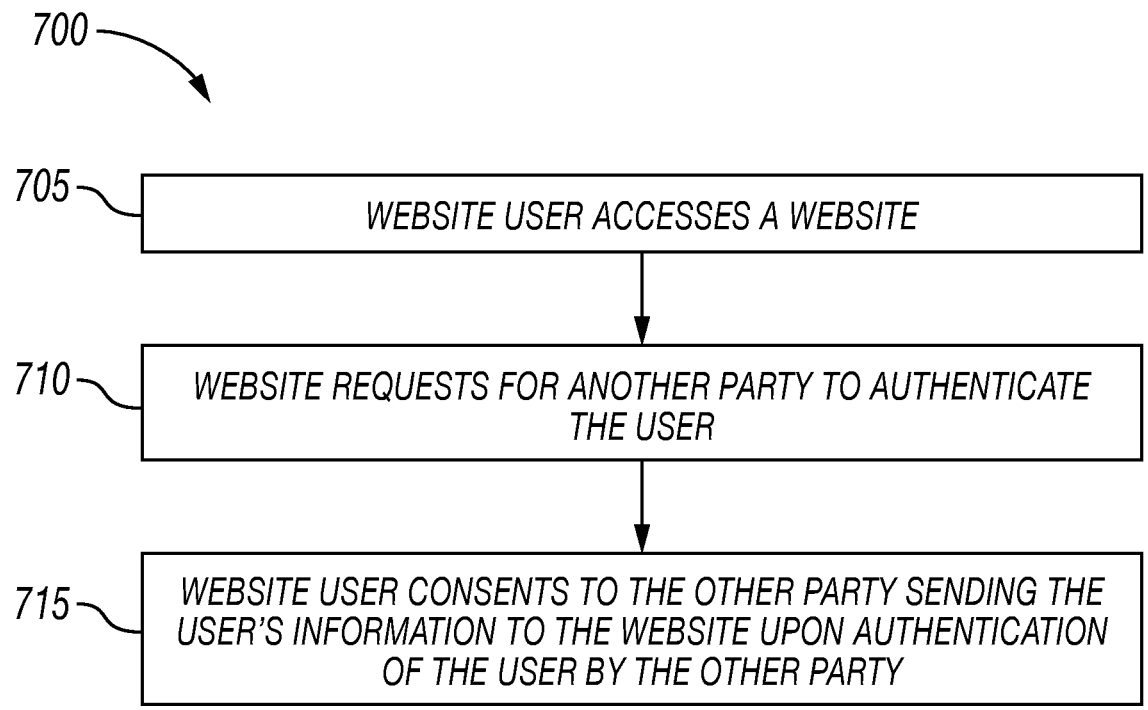
FIG. 7 is a flow chart illustrating, at a top level, a method for performing a transaction on a website according to some embodiments of the disclosure.

FIG. 7 illustrates a method 700 for performing a transaction on a website in accordance with some configurations described in this disclosure. At block 705, a website user accesses a website (the website is accessed by the user). Thus, at this block, for example, a customer can access a restaurant website to place a food order.

At block 710, the website requests for another party to authenticate the user. In this case, the restaurant's website would request for the OD server to carry out a customer authentication procedure as described herein. (The other party, OD server, carries out the authentication.)

At block 715, the website user consents to the other party sending the user's information to the website upon authentication of the user by the other party. (The other party sends the user's information and the website receives it.) Release and transfer of such information may include the customer's credit card data, home address, phone number, email address, etc., depending on the consent given by the customer.

Figure 8:
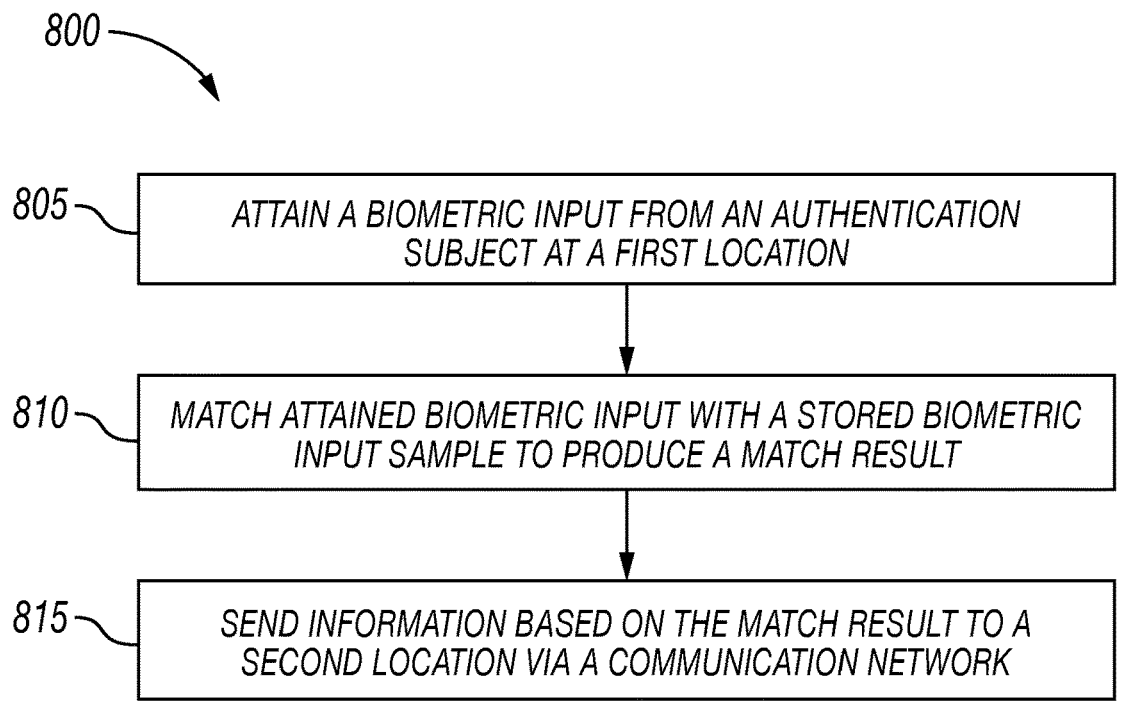
FIG. 8 is a flow chart illustrating, at a top level, a method for authenticating a subject according to some embodiments of the disclosure.

FIG. 8, in accordance with some configurations described in this disclosure, illustrates a method 800 for authenticating a subject. At block 805, a biometric input is attained from an authentication subject at a first location. For example, in an enterprise setting, an employee in a financial institution (the institution having a registered OD server account) can swipe his fingerprint on a fingerprint scanner at a terminal. (The first location receives the biometric input.) At block 810, the attained biometric input is matched with a stored biometric input sample to produce a match result. This can be carried out by a processor as described for the disclosed configurations.

At block 815, information based on the match result is sent to a second location via a communication network. In the case of the financial institution, an affirmative match indicator can be sent to another processor in the institution's computer network, granting the user access to protected financial data.

Although the example presented describes the authentication of an employee by the employer, other configurations may be implemented for the authentication of subjects between any parties. Thus, in some cases, all the operations of method 800 may be performed by one or more devices of a single entity, while in other cases, different ones of the operations may be performed by different devices of different entities. For example, in a non-enterprise setting, one or more operations could be performed at a client device of an individual user. As another example, in operation 815, the information could be sent from an OD server to a website or other entity. Other variations are possible.

Figure 9:
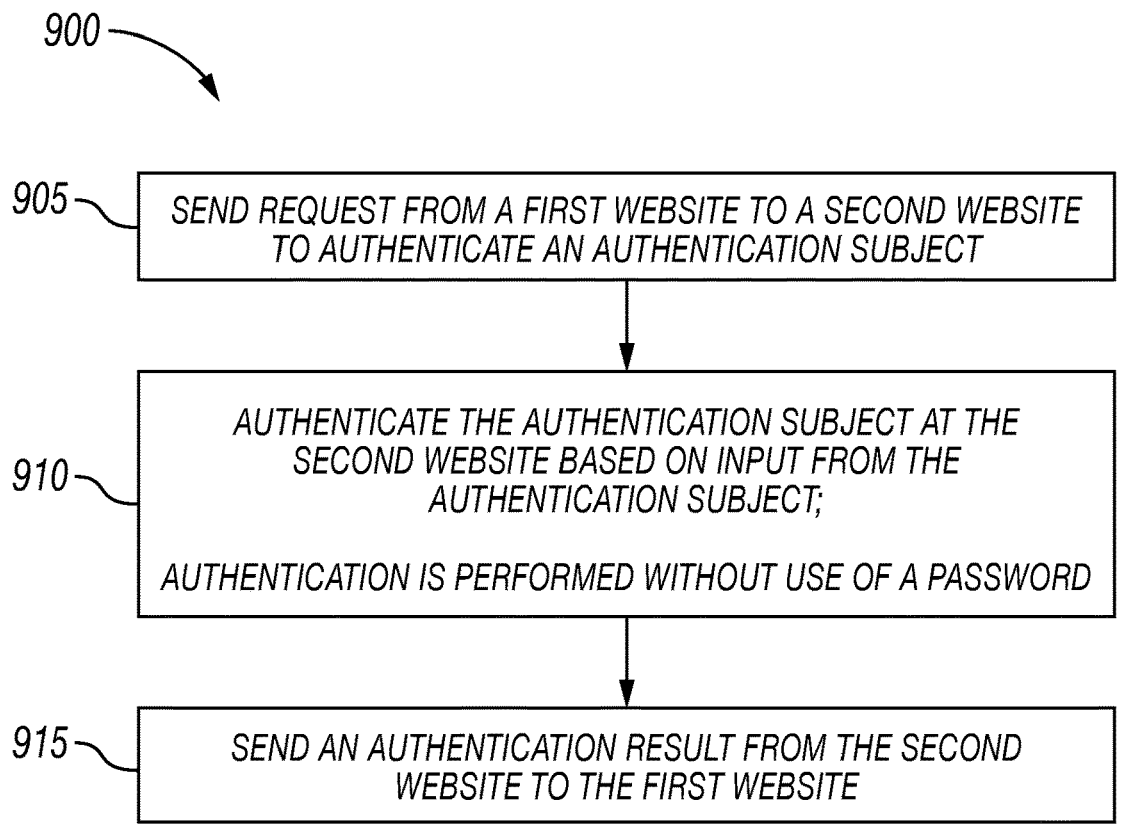
FIG. 9 is a flow chart illustrating, at a top level, another method for authenticating a subject according to some embodiments of the disclosure.

FIG. 9, in accordance with some configurations described in this disclosure, illustrates a method 900 for authenticating a subject. At block 905, a request is sent from a first website to a second website to authenticate an authentication subject. Such a configuration can be implemented, for example, by an online vendor website automatically sending a request to an OD server website to authenticate a potential vendor customer.

At block 910, the authentication subject is authenticated at the second website based on input from the authentication subject. The customer provides the input uniquely associated with him (e.g., fingerprint, retinal scan, mobile device acknowledgement, etc.) and is authenticated by the OD server via an authentication process as disclosed herein. Notably, the authentication step does not require a password.

At block 915, an authentication result is sent from the second website to the first website and received by the first website. As described for other configurations disclosed herein, the OD server website communicates the authentication match to the vendor website. In some configurations, the OD server may be configured to send additional information regarding the authentication subject (e.g., credit card data, home address, phone number, email address, etc.) along with the authentication result.

Figure 10:
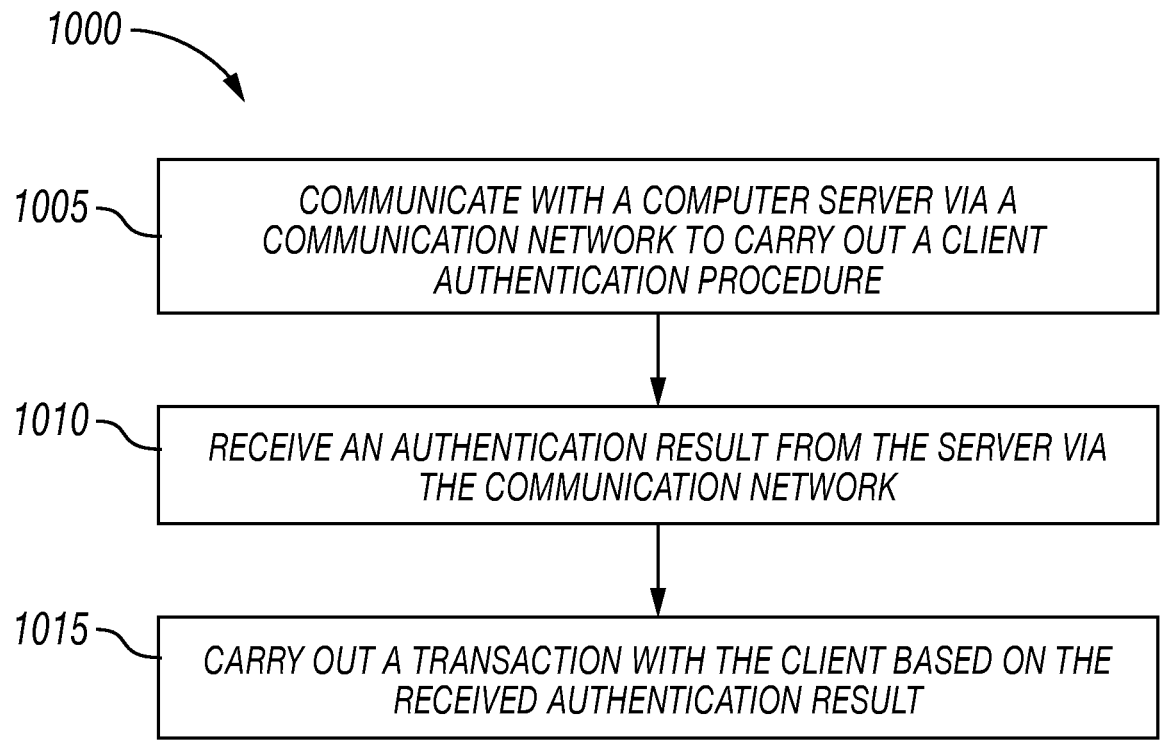
FIG. 10 is a flow chart illustrating, at a top level, a method for authenticating a client according to some embodiments of the disclosure.

FIG. 10 illustrates a method 1000 for authenticating a client in accordance with some configurations described in this disclosure. At block 1005, a party, e.g., a third-party website, communicates with a computer server via a communication network to carry out a client authentication procedure. This configuration can be implemented, for example, by a pizza shop in communication with an OD server in the cloud environment, seeking authentication of a customer placing an online order via the pizza shop's website.

At block 1010, an authentication result is received by the (e.g., third) party from the server via the communication network. In the example of the pizza shop, a customer authentication result can be sent to the shop from the OD server (having performed an authentication procedure as disclosed herein) via the Internet, for receipt by the shop.

At block 1015, the (e.g., third) party carries out a transaction with the client based on the received authentication result. Continuing with the pizza shop example, the shop can then process the customer order after receiving the affirmative authentication result from the OD server.

Figure 11:
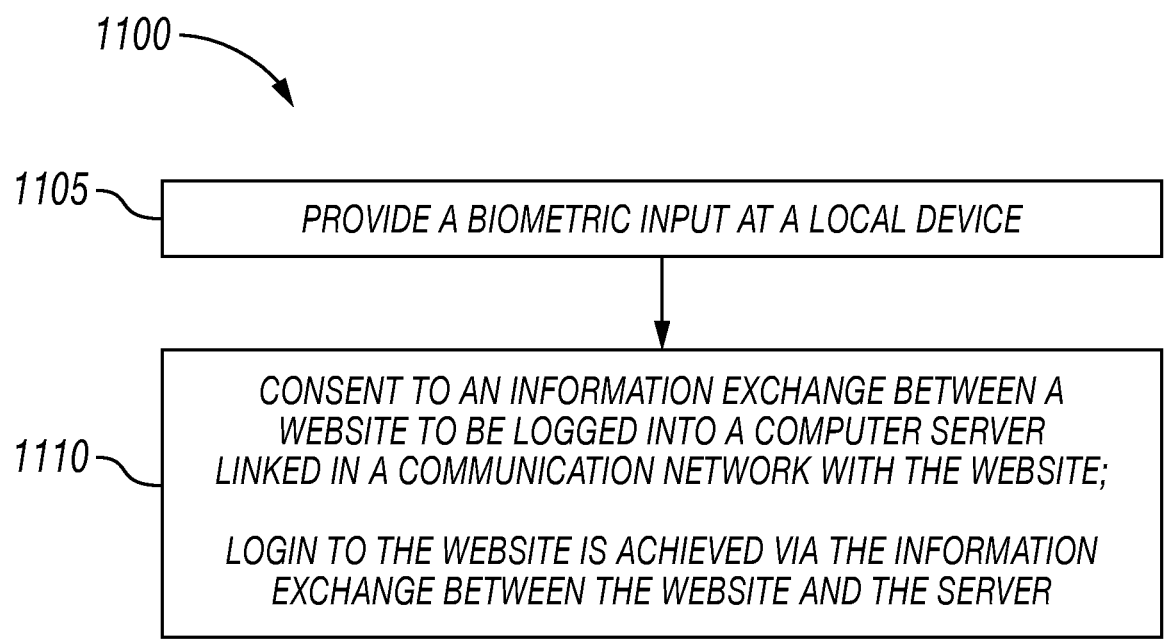
FIG. 11 is a flow chart illustrating, at a top level, a method for logging into a website according to some embodiments of the disclosure.

FIG. 11 illustrates a method 1100 for logging into a website in accordance with some configurations described in this disclosure. At block 1105, a biometric input is provided, e.g., by a user, at a local device. In some configurations, the website user may provide his biometric input (e.g., fingerprint, retinal scan, etc.) using a computer tablet, a mobile phone, a fingerprint reader, or a suitable peripheral device, and authentication may proceed as disclosed herein. At block 1110, consent is given, e.g., by a user, for an information exchange between a website the user is to be logged into and a computer server linked in a communication network with that website.

As with other configurations, the user is directed to provide consent (e.g., via a one-click affirmation screen) to the transfer of information with an OD server across the Internet or local area network, as the case may be. Login of the user to the website is achieved via the information exchange between the computer server and the website. The information exchange comprises an authentication procedure as disclosed herein to achieve login to the website.

Figure 12:
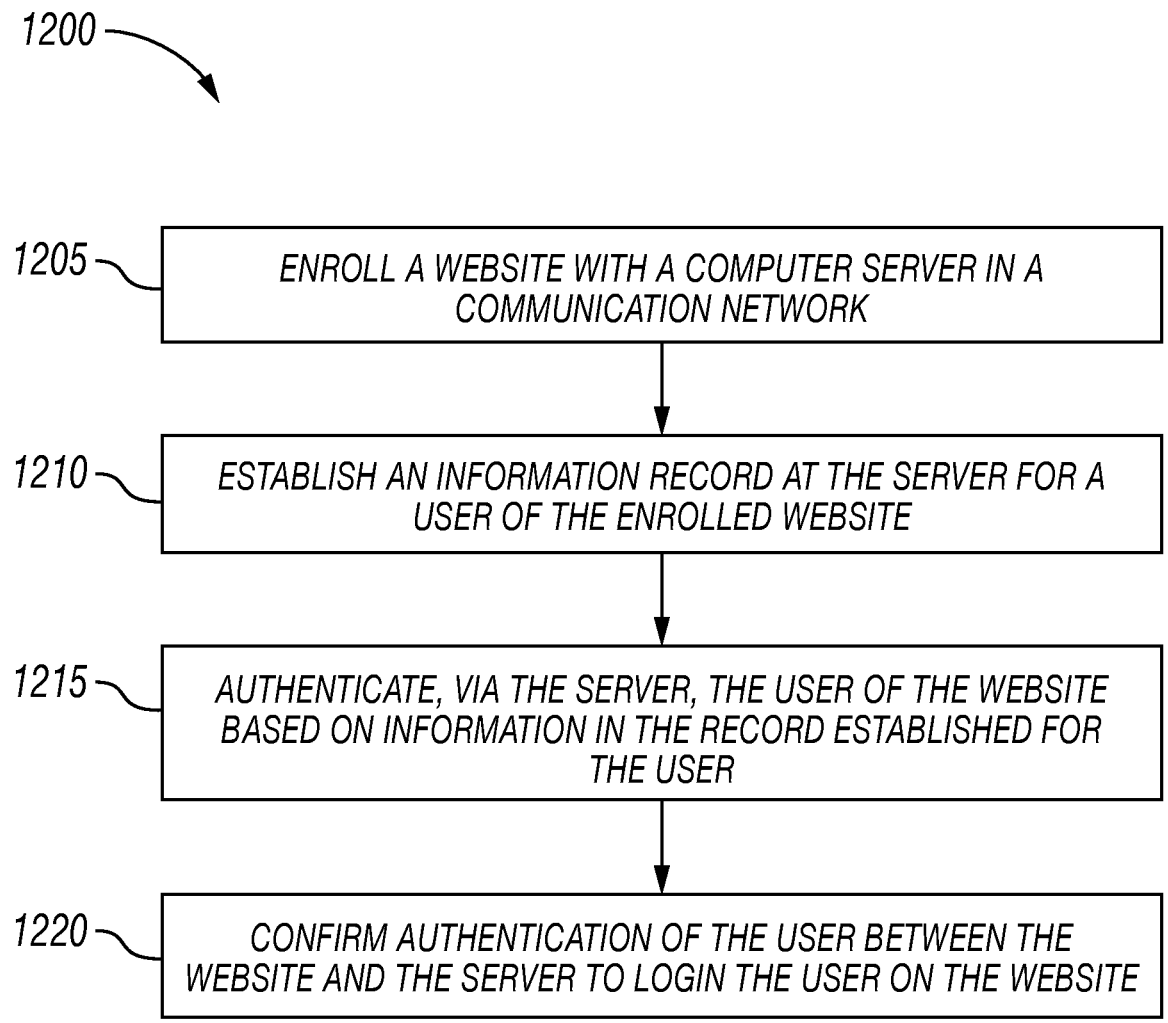
FIG. 12 is a flow chart illustrating, at a top level, a method for establishing a login capability for a website according to some embodiments of the disclosure.

FIG. 12, in accordance with some configurations described in this disclosure, illustrates a method 1200 for establishing a login capability for a website. At block 1205, a website is enrolled with a computer server in a communication network (this involves an enrollment operation by the website and an enrolling operation by the computer server). As described herein, a website operator enrolls his website with an OD server via the Internet or local area network, as the case may be.

At block 1210, an information record is established at the computer server for a user of the enrolled website. This can be carried out with the user performing an enrollment procedure with the OD server as disclosed herein. In some configurations, the website operator may enroll the user with the OD server (e.g., an employer enrolling his employees for internal user authentication).

At block 1215, the user of the website is authenticated via the computer server based on information in the information record established for the user. This is performed by performance of an authentication procedure as disclosed herein. At block 1220, authentication of the user is confirmed between the website and the computer server to login the user on the website. For example, the OD server may communicate an affirmative authentication result to the website as described herein.

Figure 13:
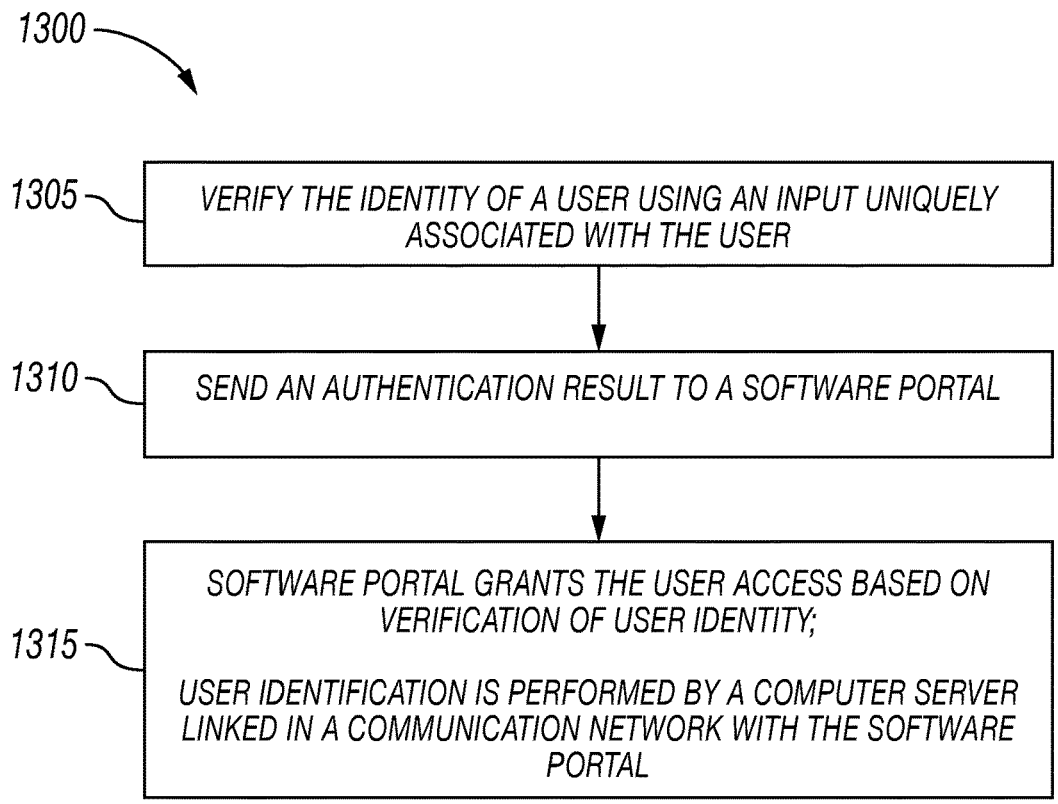
FIG. 13 is a flow chart illustrating, at a top level, a method for granting a user access at a software portal according to some embodiments of the disclosure.

FIG. 13 illustrates a method 1300 for granting a user access at a software portal in accordance with some configurations described in this disclosure. As previously discussed, techniques disclosed herein may be applied for identity authentication and information access management. As such, configurations may be implemented for authentication and information access management via any software portal (e.g., but not to be limited to, website portals, intranet portals, computer peripheral portals). At block 1305, the identity of a user is verified using an input uniquely associated with the user. This may entail verification by the user providing his unique input (e.g., fingerprint, retinal scan, mobile device acknowledgement, etc.) as disclosed herein.

At block 1310, an authentication result is sent to a software portal. This is carried out via the Internet or local area network, as the case may be. At block 1315, the portal grants the user access based on the verification of the identity of the user. In method 1300, identification of the user may be performed by a computer server linked in a communication network with the software portal. This may be carried out by an authentication process via an OD server as disclosed herein. The computer server may send the authentication result to the software portal.

Figure 14:
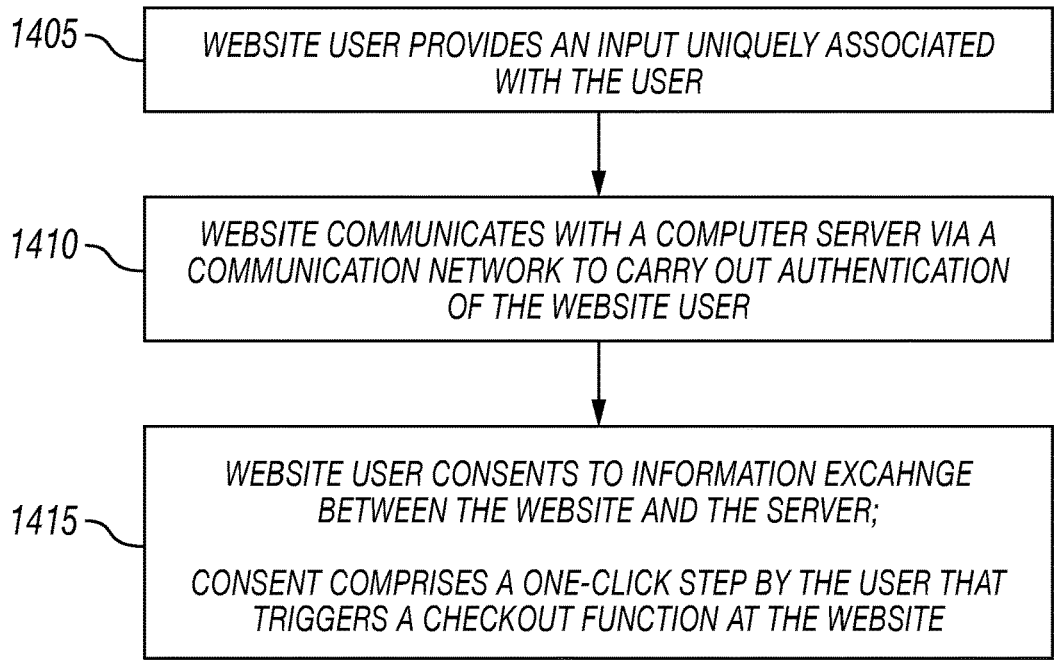
FIG. 14 is a flow chart illustrating, at a top level, a method for one-click checkout at a website according to some embodiments of the disclosure.

FIG. 14, in accordance with some configurations described in this disclosure, illustrates a method 1400 for one-click checkout at a website. A configuration may be implemented for an online vendor selling goods or services through a website (including via an App). At block 1405, a website user provides an input uniquely associated with the user. In some configurations the user provides his biometric input (e.g., fingerprint, retinal scan, etc.) using a computer tablet, a mobile phone, a fingerprint reader, or a suitable peripheral device.

At block 1410, the website communicates with a computer server via a communication network to carry out authentication of the user. This is carried out by an authentication process as disclosed herein. At block 1415, the website user consents to an information exchange between the website and the computer server.

As with other configurations, the website user is directed to provide consent to the transfer of information with an OD server across the Internet or local area network, as the case may be. Affirmative consent comprises a one-click step (e.g. via an affirmation prompt on a screen) by the website user, which triggers a checkout function at the website. In this manner, an OD server handles the user authentication process, as well as the exchange of user information with the website, freeing the user from having to remember any passwords and streamlining the checkout process. On the website side, the site is assured of secure user authentication and there is no need for the site to store user information since it is provided by the OD server.

3. Other Implementations

Figure 15:
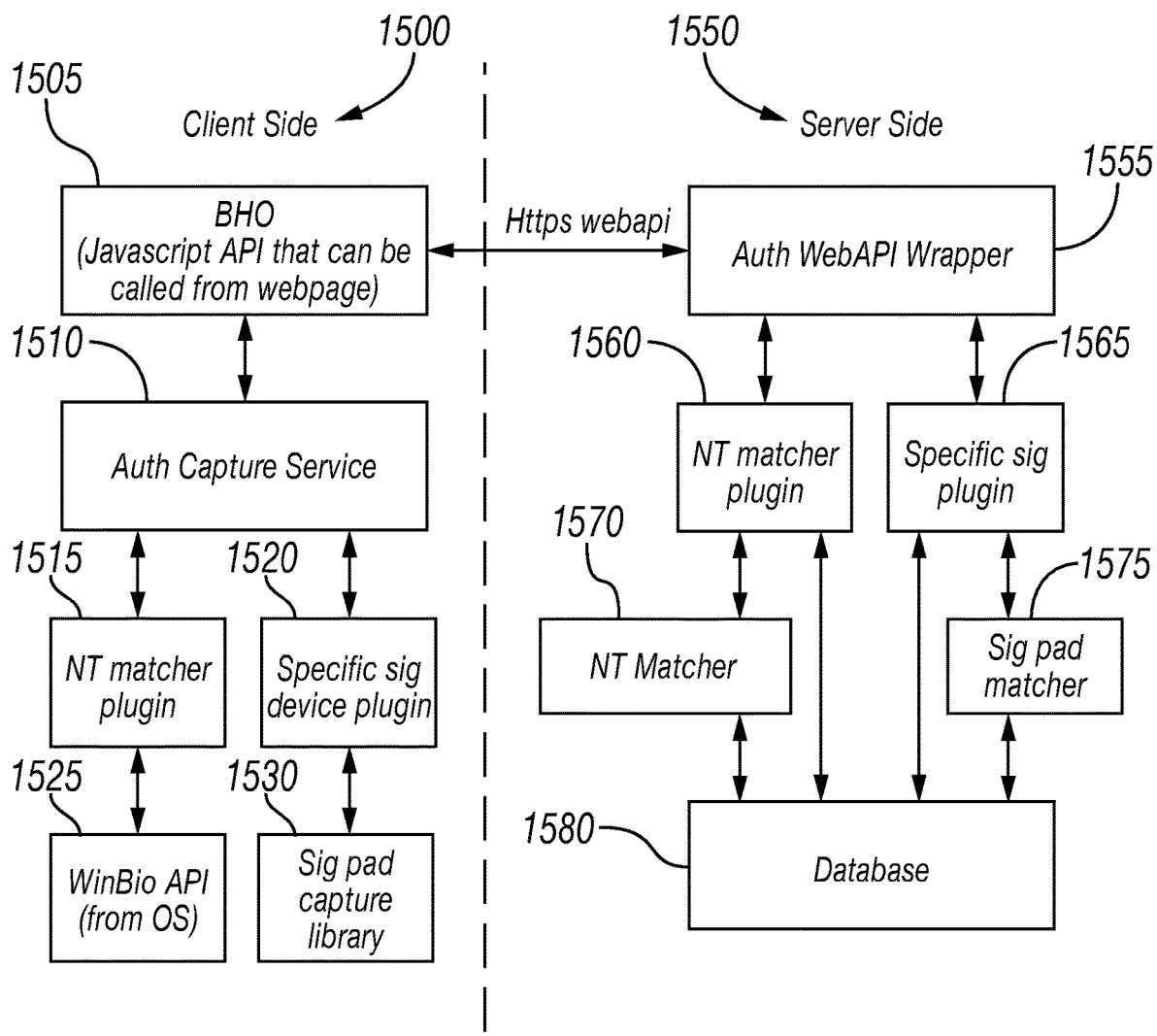
FIG. 15 depicts a schematic drawing of another exemplary implementation for authenticating a subject according to some embodiments of the disclosure.

FIG. 15, in accordance with some configurations described in this disclosure, illustrates a schematic of systems and methods of this disclosure. Like FIG. 3, the schematic of FIG. 15 shows components divided between a Client Side 1500 and a Server Side 1550 (i.e. OD server) using various plugins.

In this version, the Client Side 1500 includes BHO 1505, Auth Capture Service 1510, NT matcher plugin 1515, Specific sig device plugin 1520, WinBio API 1525, and Sig pad capture library 1530. In some configurations, the client side 1500 may include other elements instead of one or more of the aforementioned elements, or in addition to the aforementioned elements. The client side includes the following:

BHO 1505—this component can export a JavaScript API that can be called by the webpage. These APIs may be custom defined, and may include: Enrolluser (takes userId, device type, and callback func as parameters); ValidateUser (takes userId, device type and callback func as parameters); IdentityUser (takes userId and callback func as parameters); RemoveUser (takes userId, device type as parameters). In these cases, callback func is a JavaScript function that can be called in the webpage that will update the UI. This way the capture UI and text changes are embedded in the page and not a "pop-up" dialog from the BHO.

Auth Capture Service (or library) 1510—a service with admin privileges that can perform capture with no UI and send messages back to BHO 1505, which can then call the js callback in the webpage to update the UI. When operation is completed, auth capture library 1510 can package up the device specific images (fp or sig) and send them to BHO 1505. Auth capture library 1510 may be designed so that it can enumerate device plugins and load and use them. This way additional devices can be added to the authentication system.

Device class plugins (FP 1515 and Sig 1520)—this component allows interaction with the lower level library (e.g., WinBio 1525 or sig 1530) without having to code specific device type code in the auth capture library 1510. For example, if NT matcher needs images to enroll, then the NT plugin 1515 will call WinBio 1525 and will package the images into one data packet which is given to auth capture service 1510 so that auth capture service 1510 can send this back to BHO 1505.

The Server Side 1550 includes Auth WebAPI wrapper 1555, NT matcher plugin 1560, Specific sig device plugin 1565, NT matcher 1570, Sig pad matcher 1575, and Database 1580. In some configurations, the Server Side 1550 may include other elements instead of one or more of the aforementioned elements, or in addition to the aforementioned elements.

Auth WebApi wrapper 1555 is a component that can implement enroll, identify, validate and delete APIs on the server side. These APIs may need to get a device type to know which device to pass the calls to. These APIs take userId and fp image (or sig image) and call the underlying auth matcher to process based on whether the call is enroll, identify, validate or remove. Similar to the auth capture service, the Auth WebApi wrapper can enumerate device matcher plugins on the server and load them so that more devices can be supported in the future. As for the device matcher server plugins (NT matcher 1560 or sig pad matcher 1565), this component can perform the specific operations for enroll, identify, validate and remove for the specific device type.

An implementation of the configuration of FIG. 15 entails:

Enrollment Flow—Webpage invokes enroll Javascript (JS) API, which may be exported by the BHO 1505. The BHO 1505 will get the userId, device type and JS callback func for the UI. BHO 1505 may save the JS callback func to call later during an enrollment process. The BHO 1505 may also interact with the Auth Capture service 1510 and tell the service 1510 what device is being requested. The Auth capture service 1510 may initiate auth capture via an underlying device plugin 1515 or 1520 (e.g., NT plugin 1515). The device plugin 1515 or 1520 may call an underlying library 1525 or 1530. The device plugin 1515 or 1520 may call back to the auth capture service 1510 during the enrollment process as needed, and the auth capture service 1510 will receive callbacks and forward callbacks to BHO 1505 which will then call JS callback in the webpage that is saved when enrollment started. The JS callback in the webpage can update its UI accordingly. The device plugin 1515 or 1520 may call an underlying library 1525 or 1530 as needed until all captures for enroll are completed. In the case of NT, this means that the device plugin 1515 may call WinBio 1525 multiple times to capture images. Once completed, the device plugin 1515 (or 1520) can package up all the images as a data block and send it to the auth capture service 1510 indicating enroll capture is complete. Auth capture service 1510 tells BHO 1505 that enroll capture is complete. BHO 1505 can then call WebAPI 1555 with the userId, device type, and capture data block. On the server side, WebAPI wrapper 1555 can pick up the parameters and then, based on the device type, call the device plugin 1560 or 1565 (e.g. NT matcher plugin 1560). The NT matcher plugin 1560 (or specific sig plugin 1565) can call NT matcher 1570 (or sig pad matcher 1575) to build an enroll template. Either NT matcher 1570 or NT matcher plugin 1560 can write a template to DB 1580 under a specific userID. The NT matcher plugin 1560 can also save the raw enroll capture data (images). Upon success, Webapi 1555 will return success to BHO 1505. In case of error, Webapi 1555 can return error and BHO 1505 can restart the process. When BHO 1505 is complete with success, it can inform JS callback in the webpage and the webpage can update.

Validate Flow—Webpage can invoke validate Javascript (JS) API, which may be exported by the BHO 1505. The BHO 1505 can get the userId, device type, and JS callback func for the UI. BHO 1505 may save the JS callback func to call later during the validation process. BHO 1505 may interact with the Auth Capture service 1510 and tell the service what device is being requested. The Auth capture service 1510 may initiate auth capture via an underlying device plugin 1515 or 1520 (e.g., NT plugin 1515). The device plugin 1515 or 1520 may call an underlying library 1525 or 1530. The device plugin 1515 or 1520 may call back to the auth capture service 1510 during the validation process as needed and the Auth capture service 1510 can receive callbacks and forward callbacks to BHO 1505 which will then call JS callback in the webpage that is saved when validation started. The JS callback in the webpage can update its UI accordingly. The device plugin 1515 or 1520 can call an underlying library 1525 or 1530 to capture the user fingerprint. Once complete, the device plugin 1515 or 1520 can package up the image as a data block and send it to the auth capture service 1510 indicating validation capture is complete. Auth capture service 1510 can tell the BHO 1505 that validate capture is complete. BHO 1505 can then call validate WebAPI 1555 with the userId, device type, and capture data block (single image). On the server side, WebAPI wrapper 1555 can pick up the parameters and, based on device type, call the device plugin 1560 or 1565 (e.g. NT matcher plugin 1560). The NT matcher plugin 1560 can call NT matcher 1570 to build a validate template from the image and then also call NT matcher 1570 to validate this template for the userId. The NT matcher plugin 1560 may need to read enrolled templates for the userId for passage to the NT matcher 1570 itself. NT matcher 1570 can return a match/no match status to the plugin 1560, which can return a status to the WebAPI 1555, which can return the status to BHO 1505. When BHO 1505 is complete with success, it can inform JS callback in webpage and webpage can update, if it is an error, it can send error to JS callback (so the webpage UI can be updated) and re-initiate the validation process to the auth capture library 1510.

Identity Flow—The same as Validate Flow, except user id is not passed to WebAPI 1555 when the Auth capture service 1510 tells BHO 1505 that validate capture is complete, and NT matcher 1570 needs to scan through DB 1580 until a match is found when the NT matcher plugin 1560 calls NT matcher 1570 to build the validation template from the image.

Remove Flow—Webpage can invoke enroll Javascript (JS) API, which may be exported by the BHO 1505. BHO 1505 will get the userId, device type, and JS callback function. The BHO 1505 may save the JS callback func to call later during the remove process. BHO 1505 can call WebAPI 1555 with the userId and device type. WebAPI 1555 can call the underlying device matcher to remove the user (e.g., NT matcher plugin 1560). The NT matcher plugin 1560 can remove all images and templates for the given userId and return success to WebAPI 1555 and success back to BHO 1505. The BHO 1505 can call webpage JS callback with success and webpage can update accordingly.

Figure 16:
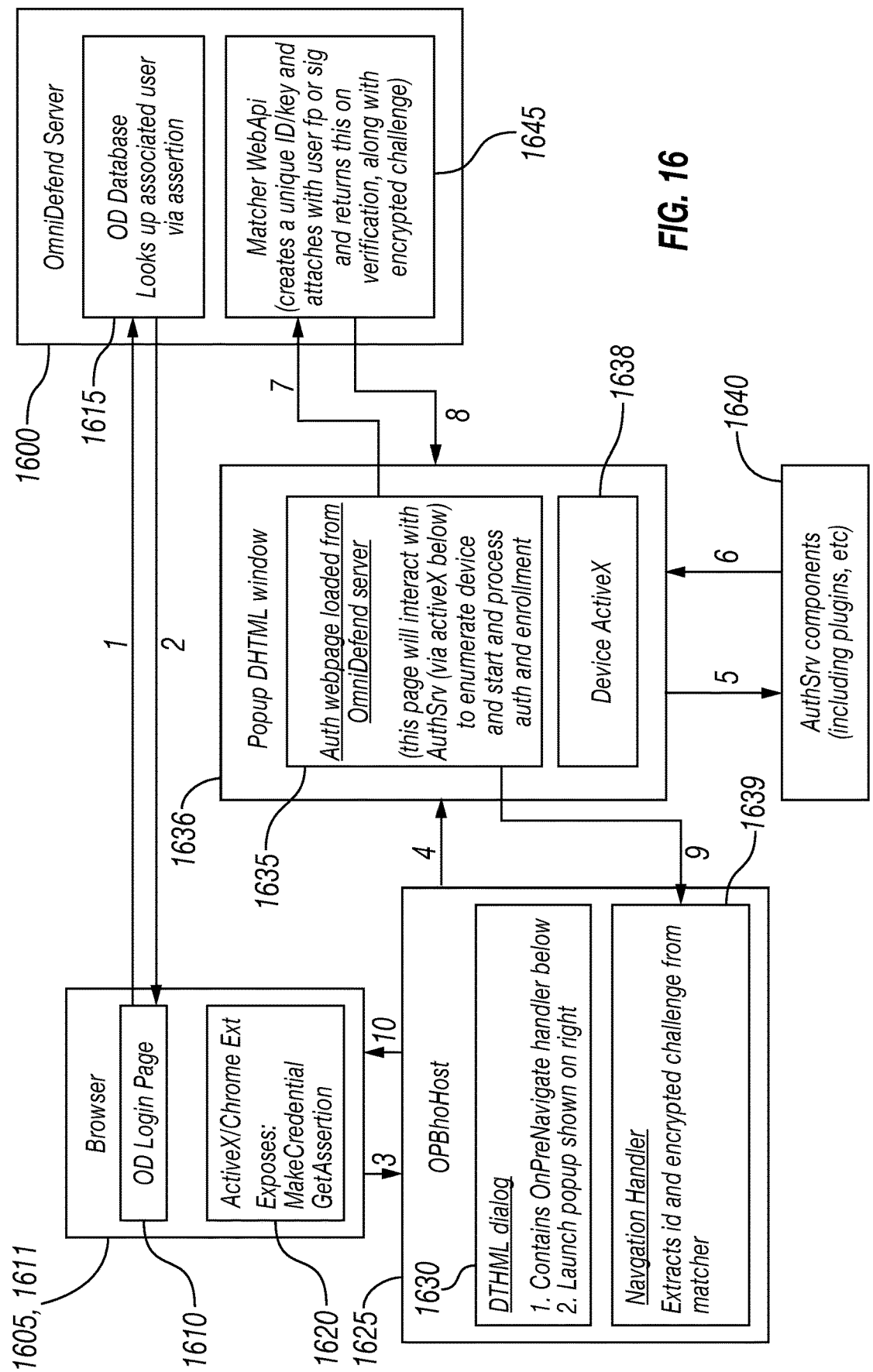
FIG. 16 depicts a schematic drawing of an exemplary implementation for authenticating a subject according to some embodiments of the disclosure.
Figure 17:
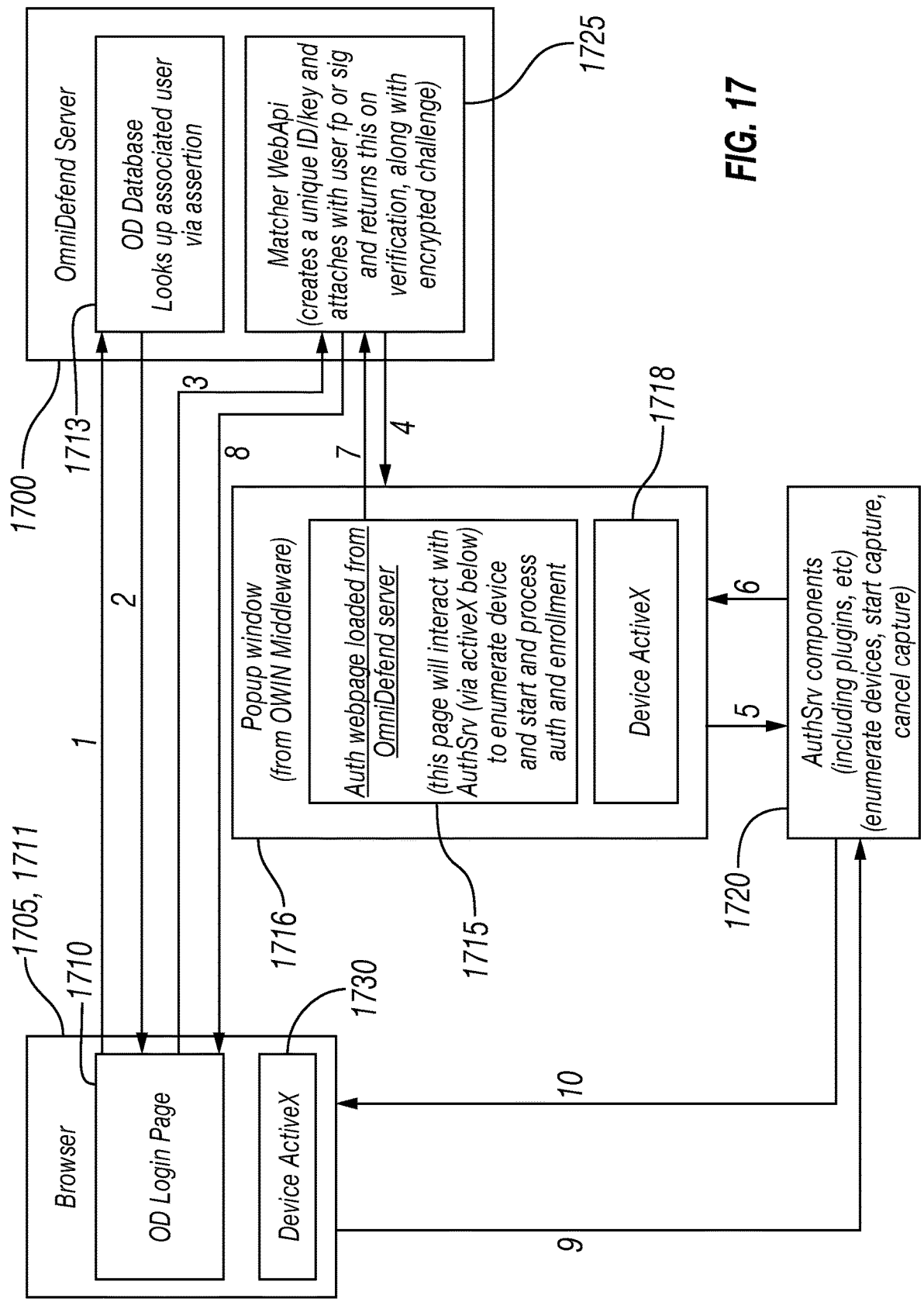
FIG. 17 depicts a schematic drawing of another exemplary implementation for authenticating a subject according to some embodiments of the disclosure.

FIG. 16 and FIG. 17, in accordance with some configurations described in this disclosure, illustrates schematics for systems and methods of this disclosure. The schematics of FIGS. 16 and 17 depict process frameworks that can be used to implement configurations of this disclosure using the techniques and processes disclosed herein. These figures illustrate the process flow between the server 1600 and the client machine 1605 when the user is enrolling an authentication device or later using that authentication device for verification.

FIG. 16 shows an implementation of an enrollment and verification flow that is compatible to the Fast Identity Online (FIDO)® specification. The first step (step 1) in this type of enrollment or verification is for the application or website to navigate to the OmniDefend Login or Enrollment page 1610 in a browser 1611 context. This page calls the server through REST APIs to get information about the user who is trying to enroll or be verified. The server consults its database 1615 and returns this user information back to the OmniDefend Login or Enrollment page 1610 as shown in step 2. This information could also be in the form of a challenge that needs to be signed or verified.

This user information passes via the browser extension 1620 (e.g. ActiveX or Chrome Extension) to a OPBhoHost component 1625 which will display a dialog window 1630 that embeds a web browser control as shown in step 3. This web browser control navigates to a device specific enrollment or verification webpage 1635 (e.g., displayed in popup window 1636) in step 4. For example, in the case of a fingerprint enrollment, a webpage could be shown that allows the user select a finger to enroll.

Using a browser extension 1638 (e.g., DeviceX), the webpage will interact with the authentication device (not shown) via the AuthSrv components 1640 in step 5 to initiate the enrollment or authentication process. For example a fingerprint reader will now accept a fingerprint touch or swipe. The authentication device information is passed back to the webpage 1635 via step 6. The webpage 1635 can then pass this authentication device information to the server matcher WebApi 1645 in step 7. The server 1600 can then process the authentication device information. For example during a fingerprint enrollment, the authentication device information may be the fingerprint image which then is converted by the matcher WebApi 1645 into a fingerprint template and stored in the database 1615.

Information regarding the authentication or verification is passed back to the webpage 1635 via step 8. This information will be passed back to the OpBhoHost 1625 via step 9. For example, in the case of a fingerprint verification, this information would include the id of the user that has been verified. The Navigation Handler 1639 will extract this id information and other verification data (e.g. an encrypted challenge) and will return this information to the browser extension 1620 (step 10). The browser extension 1620 will return this information to the OD Login or Enrollment page 1610 in the form of a response to an API call (e.g. MakeCredential or getAssertion) that was initially made by the OD Login or Enrollment page 1610.

FIG. 17 illustrates the process flow between the server 1700 and client machine 1705 when the user is enrolling an authentication device or later using that authentication device for user verification in a method that does not use the FIDO standard specification. The first step (step 1) in this type of enrollment or verification is for the application or website to navigate to the OmniDefend Login or Enrollment page 1710 in a browser 1711 context.

This page calls the server 1700 through REST APIs to get information about the user who is trying to enroll or be verified. The server 1700 consults its database 1713 and returns this user information back to the OmniDefend Login or Enrollment page 1710 as shown in step 2. In the 3rd step, the OmniDefend page 1710 will call an API on the server 1700 to initiate an enrollment or authentication/authorization operation for the user. The server 1700 redirects the client browser 1711 context to an enrollment webpage 1715 (e.g., displayed in popup window 1716) that is specific to the device that is being enrolled or authenticated, in step 4. For example, in the case of fingerprint enrollment, a webpage could be shown that allows the user to select the finger to enroll.

When the user initiates the enrollment or verification process on the webpage, the webpage uses browser extension 1718 (e.g., Device ActiveX) to initiate the enrollment or verification on the authentication device hardware (not shown) via AuthSrv components 1720 at step 5. The authentication device returns enrollment or verification information back to the webpage via AuthSrv components 1720 at step 6. The webpage 1715 running in the browser 1711 context will return this enrollment or verification information back to the server 1700 via step 7. The server 1700 processes this enrollment or verification information. For example in the case of a fingerprint reader, the server matcher WebAPI 1725 may create a fingerprint template from the fingerprint image sent to the server for enrollment.

In the case of user verification, the fingerprint template may be matched against a database of fingerprint templates to find the user that is matched. In step 8, the information of the user enrolled or the user who is verified is sent back to the client application 1705 that initiated the enrollment or verification flow.

FIG. 17 also illustrates a user verification or enrollment flow that works in the background and does not display any user interface. For example, an authentication client that requests user verification may want to initiate that verification on the authentication device hardware without explicitly displaying a user interface. In this case the OmniDefend login or enrollment page 1710 uses browser extension 1730 (e.g. Device ActiveX) to directly call the AuthSrv components 1720 to initiate the authentication on the authentication device via step 9. The AuthSrv 1720 returns the authentication information back to the OmniDefend login page 1710 via step 10, and this authentication information can be sent to the server 1700 via step 3 and the response indicating user authentication or enrollment (or failure of authentication/enrollment) can be sent from server 1700 back to client 1705 via step 8.

Figure 18A:
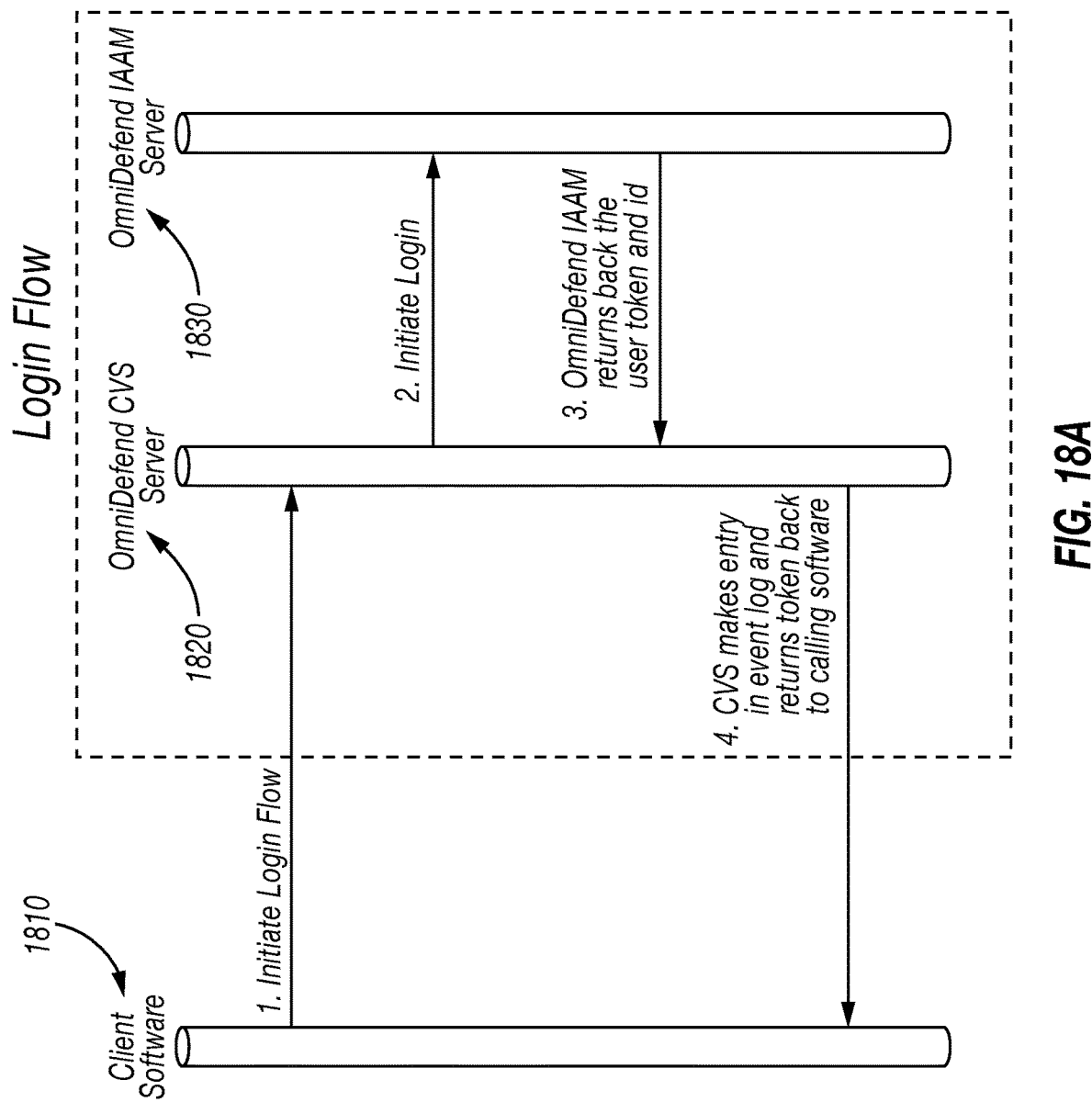
FIG. 18A depicts schematics illustrating processing and data flow according to some embodiments of the disclosure.
Figure 18B:
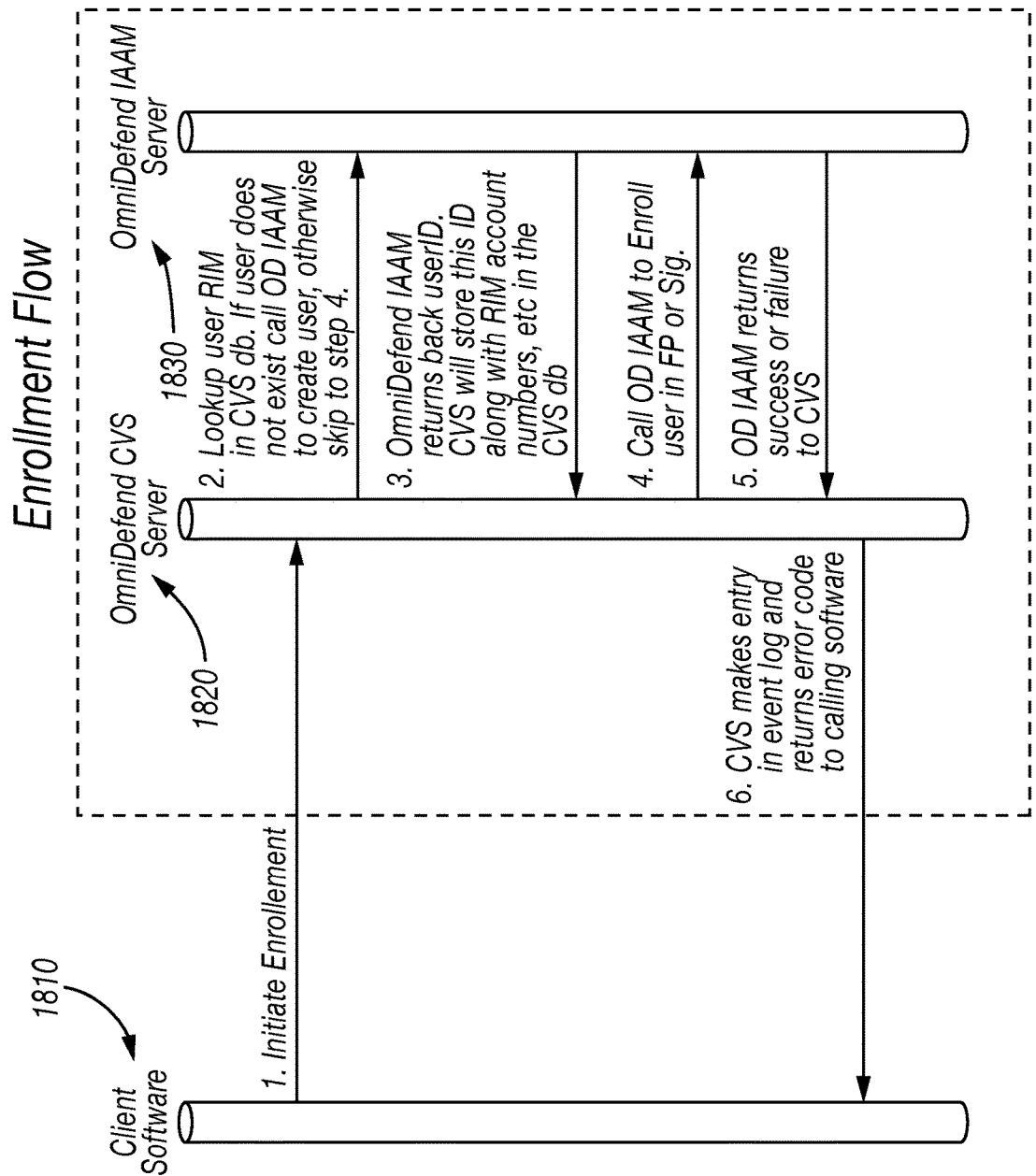
FIG. 18B depicts schematics illustrating processing and data flow according to some embodiments of the disclosure.
Figure 18C:
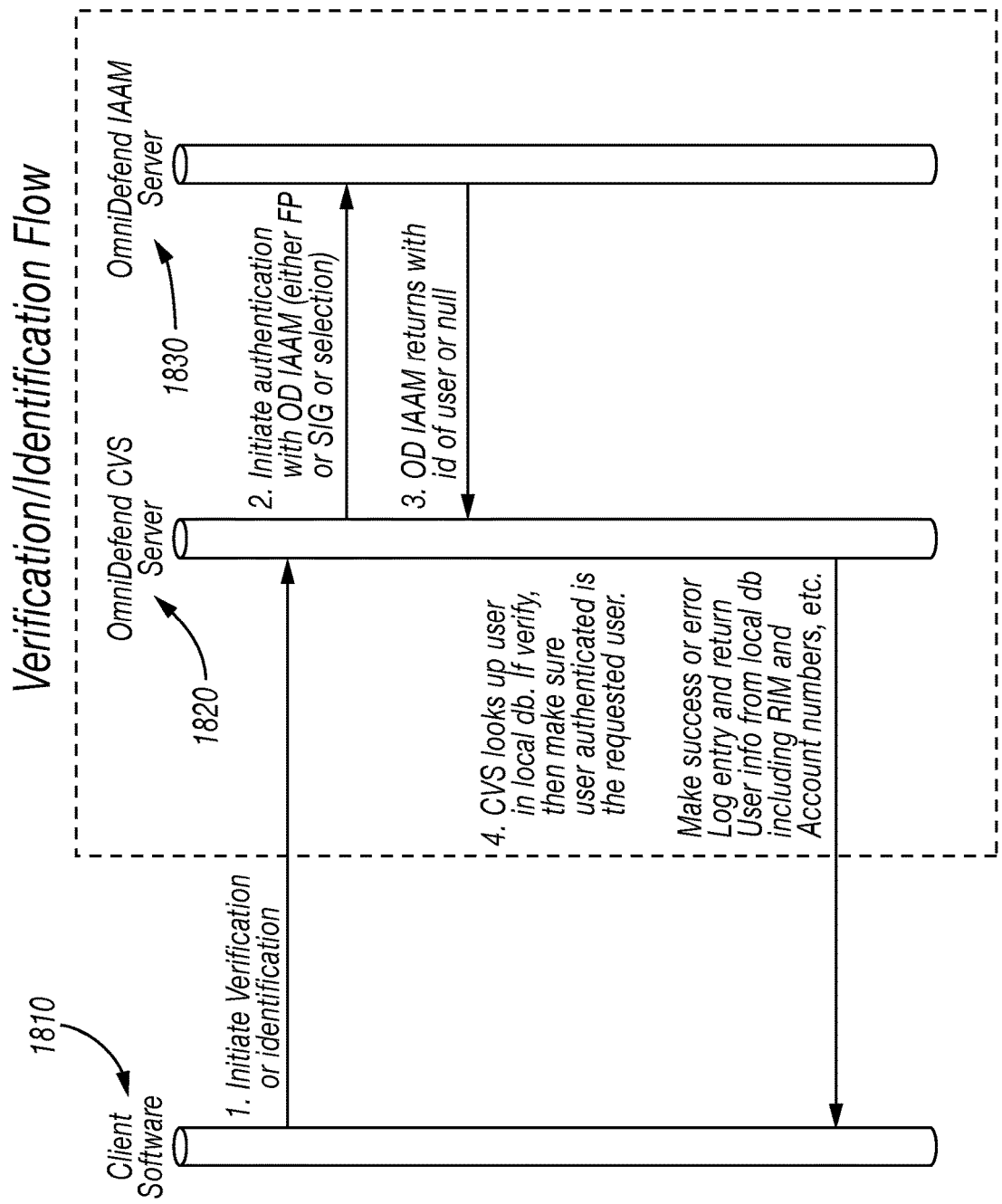
FIG. 18C depicts schematics illustrating processing and data flow according to some embodiments of the disclosure.

FIGS. 18A-18C, in accordance with configurations described in this disclosure, illustrate schematics for processing and data flow. FIG. 18A illustrates a sample Login Flow. FIG. 18B illustrates a sample Enrollment Flow. FIG. 18C illustrates a sample Verification/Identification Flow. In each of FIGS. 18A-18C, the processing and data flow involves client software 1810, a customer verification system server (OD computer verification system (CVS) server) 1820, and identity authentication and access management server (OD information assurance architectural model (IAAM) server) 1830. (Further description of a CVS server and an IAAM server is provided later in this disclosure.)

Referring to FIG. 18A, the Login Flow may operate as follows: At point 1, the login flow is initiated between the client software 1810 and the OD CVS server 1820. At point 2, login is initiated between the OD CVS server 1820 and the OD IAAM server 1830. At point 3, the OD IAAM server 1830 returns the user token and id (for the user who is logging in) to the OD CVS server 1820. At point 4, the OD CVS server makes an entry in an event log and returns the token to the calling software (client software 1810).

Referring to FIG. 18B, the Enrollment Flow may operate as follows: At point 1, enrollment is initiated between the client software 1810 and the OD CVS server 1820. At point 2, the OD CVS server 1820 looks up the user RIM in its database. If the user does not exist, a call is made to the OD IAAM server 1830 to create a user; if the user does exist, then the flow skips point 3 and proceeds to point 4. At point 3, the OD IAAM server 1830 returns to the OD CVS server 1820 a new userid for the user, and the OD CVS server 1820 stores this userid along with the RIM account number, etc. in the database of the OD CVS server 1820.

At point 4, the OD CVS server 1820 calls the OD IAAM server 1830 to enroll the user in FP or Sig. At point 5, the OD IAAM server 1830 returns success or failure to the OD CVS server 1820. At point 6, the OD CVS server 1820 makes an entry in an event log and returns a success or error code if applicable to the calling software (client software 1810).

Referring to FIG. 18C, the Verification/Identification Flow may operate as follows: At point 1, verification or identification is initiated between the client software 1810 and the OD CVS server 1820. At point 2, the OD CVS server 1820 initiates authentication with the OD IAAM server 1830 (either FP or Sig or selection). At point 3, the OD IAAM server 1830 returns to the OD CVS server 1820 the id of the user (who is authenticating) or null. At point 4, the OD CVS server 1820 looks up the user in a local database. If the OD CVS server 1820 verifies the user, then the OD CVS server 1820 makes sure the user authenticated is the requested user. At point 5, the OD CVS server 1820 makes a log entry of success or error and returns the user information from the local database, including RIM and account numbers, etc. to the client software 1810.

Figure 19:
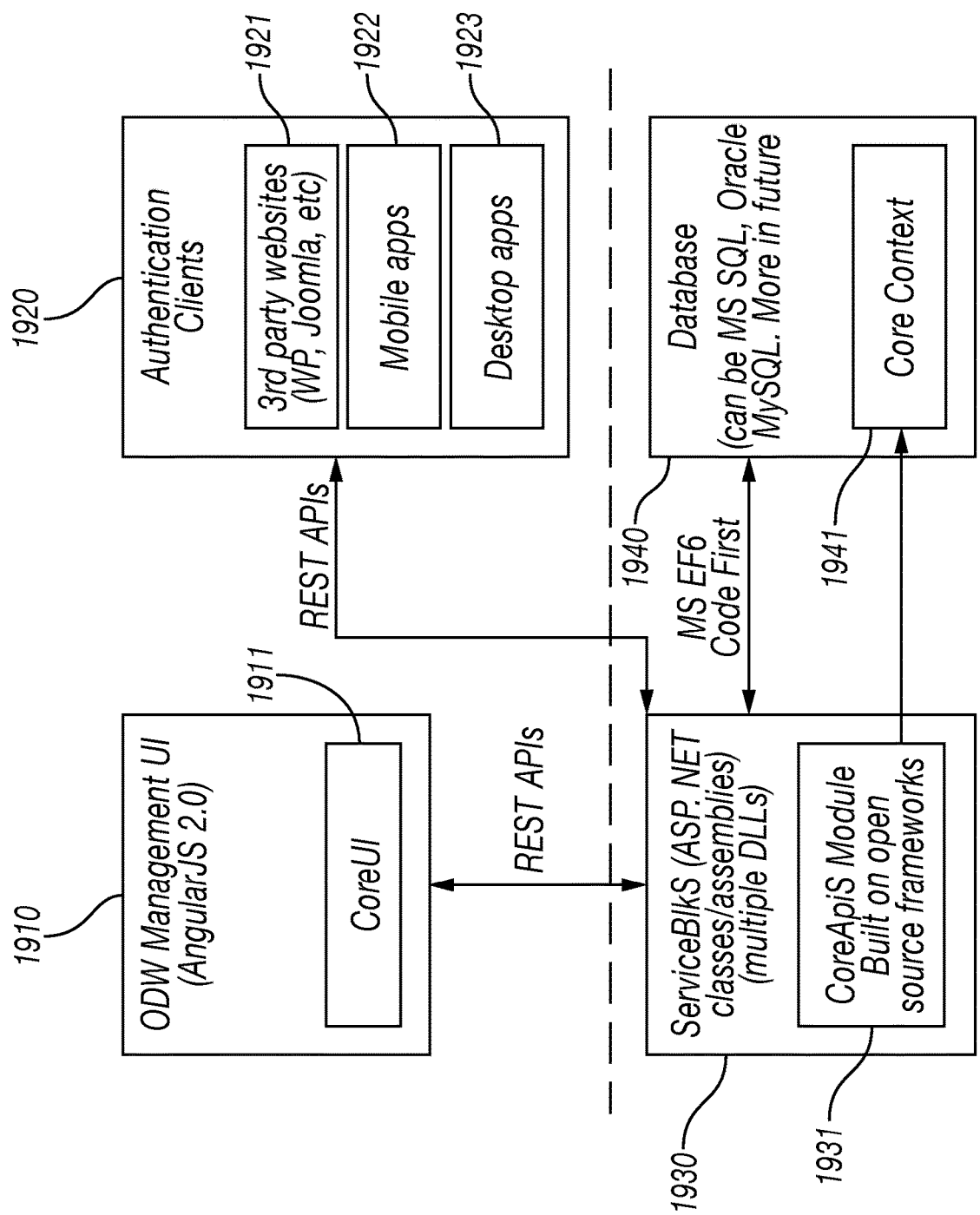
FIG. 19 depicts a schematic drawing illustrating further detail of an exemplary implementation for authenticating a subject according to some embodiments of the disclosure.

FIG. 19 is a schematic illustrating an architecture overview and a processing flow (similar to the flow depicted in FIG. 3) according to some configurations described in this disclosure. As illustrated, the architecture may include an OmniDefend for Websites (ODW) Management UI 1910 including Core User Interface 1911, Authentication Clients 1920 including 3rd party websites 1921 (WP, Joomla, etc.), Mobile apps 1922, and Desktop apps 1923, ServicesBlkS 1930 including CoreApiS Module 1931, and Database 1940 including core context 1941. Interaction between these components may be conducted via an application program interface (e.g. REST API) or other internet API protocols, or via a database middleware such as Microsoft Entity Framework, as illustrated.

In this architecture, a website or application developer or administrator that seeks to add user authentication, authorization and identity management to an application or website, the ODW Management User Interface 1910 may be used to create an account and then create a definition profile for his 3rd party application/website (not shown). This process makes the OmniDefend server's ServiceBlkS 1930 aware of the 3rd party application/website and the kind of authentication, authorization and user identity parameters that are requested. The ServiceBlkS 1930 uses a database middleware such as MICROSOFT® Entity Framework to store these parameters in the Server Database 1940.

The website or application developer or administrator sets up an Authentication Client 1920 in the 3rd party application or website to perform the user authentication. When a website or application user comes to a functionality in the application or website where authentication is required (e.g. the login page of a website), then the Authentication Client 1920 component would make an authentication request to the ServiceBlkS 1930 via the REST APIs. The ServiceBlkS 1930 then retrieves the authentication parameters for the given Authentication Client 1920 and performs the authentication of the user. Once the user is authenticated, role authorization information for the user for the given Authentication Client 1920 as well as identity information of the user can be passed back to the Authentication Client 1920, thus making the 3rd party website or application aware of the user that has authenticated, his role in that application (e.g. administrator, customer, special user, etc.), and also passing back any identity information desired and authorized by the user to be viewed by the 3rd party website. This identity information, for example, could be the user's address, phone number, email address, etc.

CoreApiS module 1931 implements core services for user and identity, organization information, user role and authorization, user group information, client and authentication management. WebAPIs (REST) are exposed for clients. The Management UI 1910 may be implemented in a variety of different languages or platforms, such as AngularJS 2.0, .NET 4.5 or Core, WORDPRESS®, PHP, etc. The CoreApiS 1931 may be built on proven open source frameworks. For example, implementations may use IdentityServer3, ASP .Net 4.5, ASP .Net Identity 2.0, Entity Framework 6.0 and connectors for external IdP authentication (e.g. FACEBOOK®, GOOGLE®, LINKEDIN®, etc.).

This architecture may allow the website or application developer to easily add an Authentication Client 1920 component to his application or website and then that Authentication Client 1920 component initiates the call to OmniDefend which ultimately returns back to the application or website, the user authentication, the user's role within that application or website, and the identity information of the user so that the website or application may carry on normal processing (e.g. logging the user into the website, performing an e-commerce operation for the user, etc.).

Figure 20:
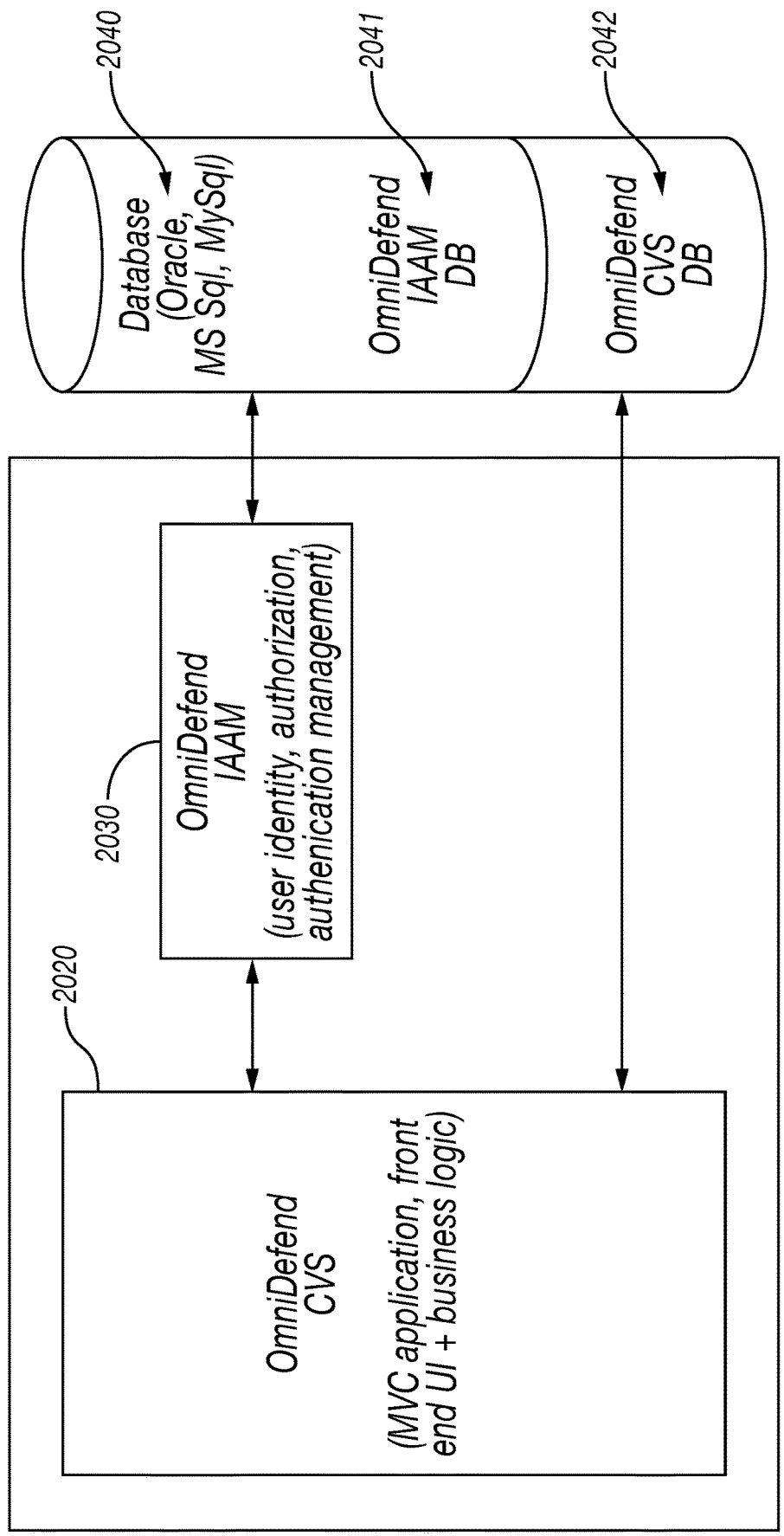
FIG. 20 depicts a schematic of a system according to some embodiments of the disclosure.

FIG. 20 illustrates a schematic of an OmniDefend system according to some configurations described in this disclosure. Certain applications or websites that are meant for a given business segment may have user authentication, authorization and identity requirements which are unique to that business segment. For example, a core banking application in a bank may require information about a user's bank account numbers, or have banking specific roles for a user (e.g. branch manager, teller, investment advisor, customer relationship manager, etc.). Likewise, there may be unique authentication profiles and procedures in a particular business segment. For example, in a bank, there may be an enrollment process for a customer's fingerprint, and that enrollment may require approval by the branch manager before the fingerprint can be used to authenticate a banking transaction. These unique authentication, authorization and identification requirements of a particular business segment may involve different user interfaces, REST APIs and process flows.

The system may include a customer verification system (CVS) 2020, which is a component that will extend the capabilities of the base OmniDefend Identity Authentication and Access Management (IAAM) system 2030, and a database 2040 which will provide extended data information required by the CVS 2020 for the given business segment. The CVS 2020 may include MVC application, front end User Interface and business logic which may also be customized for the business segment the CVS 2020 is designed for.

For example, the base OmnDefend IAAM 2030 will contain base user identity information (e.g. name, addresses, phone numbers, email addresses, etc.), base role information (e.g. employee, customer, individual, manager, etc.), and authentication information (e.g. fingerprint templates that are usable after enrollment). A CVS 2020 designed for the banking industry would extended the OmniDefend IAAM 2030 and provide user interfaces that are specific and relevant for banking customers (e.g. the dashboard could show how many customers are enrolled for fingerprint authentication by branch). A banking specific CVS 2020 could also extend the base user identity information to include the user's account numbers, main branch code, etc. The banking specific CVS 2020 could also extend the process flow and business logic of the OmniDefend IAAM 2041 to include an approval process for fingerprint enrollments which would prevent the user's fingerprint being used to validate a banking transaction until the manager has verified the user's documentation, in order to avoid fraudulent enrollments.

The business logic of the CVS 2020 may also expose REST APIs that are customized for the business segment. For example, a banking CVS 2020 may provide a REST API to authenticate a user given his bank account number. All additional data that needs to be stored by the CVS 2020 (e.g. account numbers for a user) would be stored in the database extension for the CVS referred to as the OmniDefend CVS DB 2042. Many CVS 2020 modules could be designed to extend the OmniDefend IAAM 2030 based on the business segment (e.g. healthcare CVS, banking CVS, defense CVS, etc.)

4. Example Implementations of Omnidefend

In the following, references to "OmniDefend" and the like should be understood to refer to applicable configurations of the techniques (e.g., apparatuses, systems and methods) disclosed herein. These techniques may be used, for example for financial and/or other services. These techniques may be in the form of IAM solutions used to identify employees and customers accurately, as well as to protect customer data, personal information and transactions. The ability to establish and verify the identities of customers and employees, as well as ensure the security of their transactions, may be used to maintain customer security and trust.

Various high security industries, such as the Banking & Financial Services Industries (BFSIs), online merchants, and secure website companies, are looking to seize far broader business benefits by exploiting new identity solutions, including biometrics and advanced analytics technologies, to reduce fraud, waste and abuse. This may enhance overall security of the organization, and increases customer loyalty, retention and satisfaction.

The challenges facing these high security industries are as follows: retaining existing customers and acquiring new customers through the use of the latest technologies that enhance the customer banking experience; the need to eliminate fraud and reduce the risk of breaches; requiring more IT control over the customers' accounts; wanting easier ways to manage employees and customers records; requiring a centralized database that can access and manage both customers and employees; requiring more state-of-the-art security technologies; and adapting to the latest Technology in the security sector.

The OmniDefend CVS, using systems and methods disclosed herein, seek to provide the following: strengthening know your customer (KYC) process of on-boarding customers; assisting banks in their financial inclusion initiatives; profitably acquiring new customers and retaining existing ones; increasing customer satisfaction by allowing customers to sign into their sites and/or accounts just with a finger swipe or a palm touch; minimizing employee sign-in time by enabling single sign-on to multiple accounts with a single biometric authentication; IT manages all customers and tellers from a single console and dashboard; detecting fraud and reducing charge-offs; introducing additional authentication procedures, such as knowledge-based authentication questions for the riskiest applicants or transactions; meeting compliance due-diligence requirements during application and account management processes; and preventing users from trying to register for the same institution more than once.

Features of OmniDefend include the following: OmniDefend CVS can be deployed as a standalone solution or can be integrated into a bank's Core Banking Application; provide a multi-faceted, standards-compliant Identity Management Solution designed to deliver identification requests and authentications over large databases of 1,000,000,000+ users; service many verticals markets, such as banking, financial, Government, HealthCare, Corporate, etc.; support numerous biometric devices and/or technologies (e.g., palm vein scanners, facial, tokens, etc.); provide state-of-the-art biometric algorithm to identify duplicate fingerprints in large scale biometric database, resulting in high level fingerprint matching performance without loss of accuracy; access via public cloud or deployed on premise private cloud; support to Automated Fingerprint Identification System (AFIS); provide a simple user interface to manage employees and customer log-ins; easy to learn for both customers and employees; support for all hardware platforms and common operating systems such as Windows and Unix/Linux; support for standard databases such as ORACLE®, SQL, MySQL; provides a highly-customizable architecture providing customers "best fit solutions" to address their needs.

With OmniDefend CVS, the high tech security institutions may be able to address many of the cybersecurity issues facing the BFSI Sector today, such as data breaches and identity fraud. The OmniDefend CVS may also enable the high tech security institutions to provide additional value to their customers by enhancing and simplifying the customer verification process. Customers may be able to quickly and easily sign in to their accounts with their fingerprint or palm prints, eliminating the need to provide identification or account information to carry out high security transactions, such as banking. OmniDefend CVS is simple to learn and easy to set up and deploy. OmniDefend CVS can increase overall security while enhancing the banking experience of customers.

OmniDefend may be understood as a Web-based Identity and Authentication management system. It can be configured in multiple 'flavors' for different market segments. One flavor is 'OmniDefend for Websites' (ODW). In this configuration, OmniDefend is characterized as follows: allows "client applications" (e.g. websites, mobile apps, desktop apps, etc.) to authenticate users and manage all user related information; provides user, organization, group and role management; provides standards-based backend, implements OAuth2, OpenIDConnect, SCIM 2.0 and in the future other standards can be extended (e.g. SAML, WS-Federation, etc.). As an example, the COMPUTERPOINT® banking web applications (available at https://www.compupointusa.com) may use ODW to manage all users and customers and the related authentication.

Another flavor of OmniDefend is 'OmniDefend for Business (ODB). In this configuration, OmniDefend is characterized as follows: provides a platform that can be extended with functional plugins like SSO, SED Management, Antitheft, etc.; provides functional plugins can work with client side components to implement functionality like existing OmniPass and SecureDrive. As an example, ODB will be compatible with the next generation of OmniPass and SecureDrive.

OmniDefend provides the ability to visit large numbers of websites and mobile apps and give a quick and easy way to enable multi-factor authentication (MFA) and specifically fingerprint (FP) authentication into those websites and apps. OmniDefend removes the burden of user, roles, groups and organization management from websites.

Additional information regarding industry standards (discussed above) is as follows: OAuth2 is an industry standard authentication protocol for users in backend server services. OpenIdConnect is a higher level abstraction that sits on top of OAuth2. This standard basically simplifies the OAuth2 protocol so it is not as hard to call. SCIM 2.0 is an industry standard protocol for user and group management. It is a common way to add, remove and modify user information in a web-based system. FIDO® 2.0 (now W3C Web Authentication standard) is an industry standard protocol for multifactor authentication. It provides a mechanism for a browser to request authentication on a client device and send that information to a server for authentication. OmniDefend systems and methods disclosed herein may implement these protocols so that client applications can authenticate and manage users via industry standard protocols.

Further description of Open Source components disclosed herein is as follows: ASP .NET 4.5 refers to Microsoft core platform services that allow c# apps to run on a server. This exposes a framework for WebAPI (REST) and other components necessary to implement server apps. A WebAPI may be thought of as "functions over https." So the client app (website, mobile app, desktop app, etc.) can make calls to a server using https protocol, and WebApi (e.g. https://<server>/core/v1/auth/login) is an OmniDefend API to initiate a login. JavaScript Object Notation (JSON) is the data format that defines how data is sent back and forth between the client and server. See http://www.vinaysahni.com/best-practices-for-a-pragmatic-restful-api for further information about WebApis.

ASP .NET Identity 2.0 is a MICROSOFT® core platform to handle user related functions—i.e. creating a user in a database, finding a user in the database, managing password reset and user confirmation, etc. Entity Framework 6.0 is a MICROSOFT® framework that allows a server to communicate with a database. This platform supports MSSql, MySql and ORACLE®, and creates an abstraction so higher level software just uses classes to represent tables (i.e. the framework creates all the sql commands based on what data item you want to manipulate (code first)). IdentityServer3 is an open source platform that handles OAuth2, OpenID Connect, external Identity Provider (e.g. FACEBOOK®, GOOGLE®, LINKEDIN®, etc.) and other protocols. MICROSOFT® KATANA® (Open Web Interface for .NET (OWIN)) is a framework that allows authentication mechanisms to be inserted into the webapi pipeline—i.e. creates a framework that allows for processing to happen during a WebAPI call. KATANA® provides components that can be installed to do everything from authenticating cookies, to allowing for external authentication to FACEBOOK® and other providers, etc.

Figure 21:
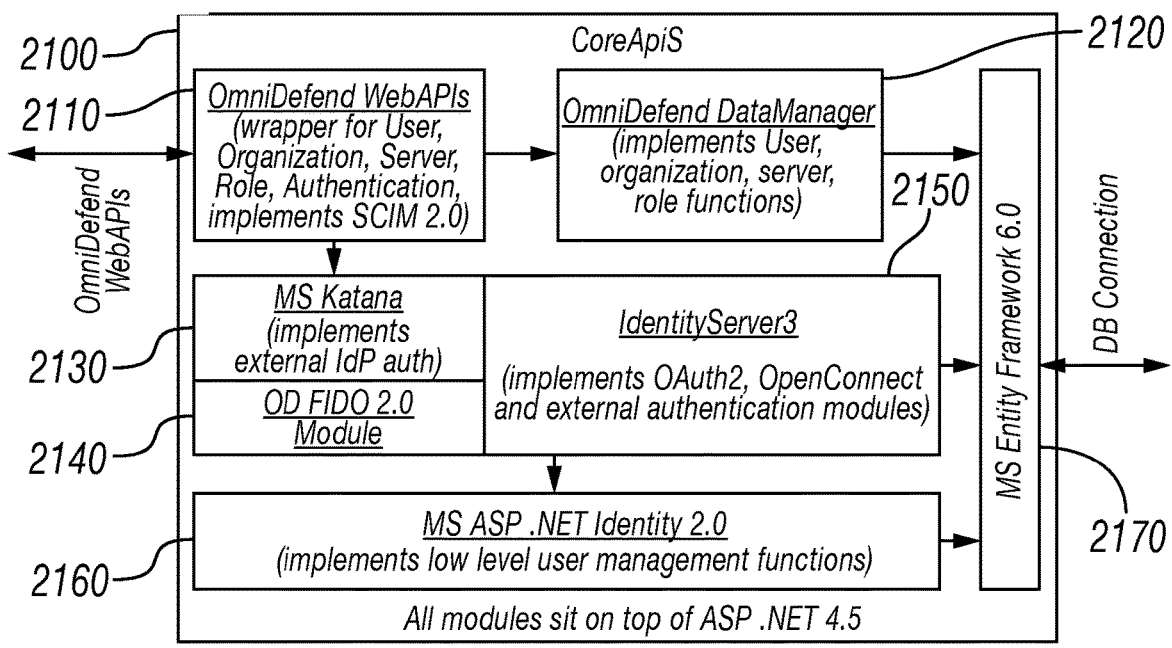
FIG. 21 depicts a schematic illustrating further detail of a system according to some embodiments of the disclosure.

FIG. 21 illustrates a non-limiting example of a CoreApiS module (see FIG. 19) in further detail. As illustrated, the CoreApiS module 2100 may include OmniDefend WebAPIs 2110, OmniDefend DataManager 2120, open source components such as MICROSOFT® KATANA® 2130 for authentication via external identity providers, OmniDefend authentication modules such as the OD FIDO 2.0 Module 2140, open source identity management components such as IdentityServer3 2150 and MICROSOFT® ASP .NET Identity 2.0 2160, and open source database middlewares such as MICROSOFT® Entity Framework 6.0 2170.

In the CoreApiS 2100, OmniDefend WebAPIs 2110 provide the external REST APIs for User, Organization, Server, Role and Authentication APIs. The WebAPIs 2110 can implement industry standards such as system for cross-domain identity management (SCIM) 2.0 for the User REST APIs or can provide custom proprietary APIs (e.g. Server REST APIs). The OmniDefend DataManager 2120 implements the low level user, organization, server, and role functions which may need to access the database to store and retrieve information. This database access is typically done via a database connector such as MICROSOFT® Entity Framework 2170.

The OmniDefend WebAPIs 2110 can interface with internal components to perform authentication of a user. In some cases, these components may be open source, such as MICROSOFT® KATANA® 2130 which can be used to implement authentication via an external identity provider (IdP) such as GOOGLE®, FACEBOOK®, or LINKEDIN®. In other cases, the authentication can be implemented using a proprietary module such the OmniDefend FIDO® 2.0 2140 which implements authentication via devices that confirm to the FIDO version 2.0 industry standard. These authentication modules could also consists of fingerprint, signature, token or other device authentication modules as well.

An open source or proprietary component such as IdentityServer3 2150 implements OAuth2 and OpenIdConnect external authentication industry standards. Additional proprietary or open source components such as Microsoft ASP .NET Identity 2.0 2160 can be used to implement low level user management functions. In the illustrated configuration, all of the modules sit on top of ASP .NET 4.5; however, other frameworks could be used for the implementation such as ASP .NET Core, JAVA®, PhP, etc. The modules interact with each other and with a database and other components (not shown) as indicated by the arrows.

Figure 22:
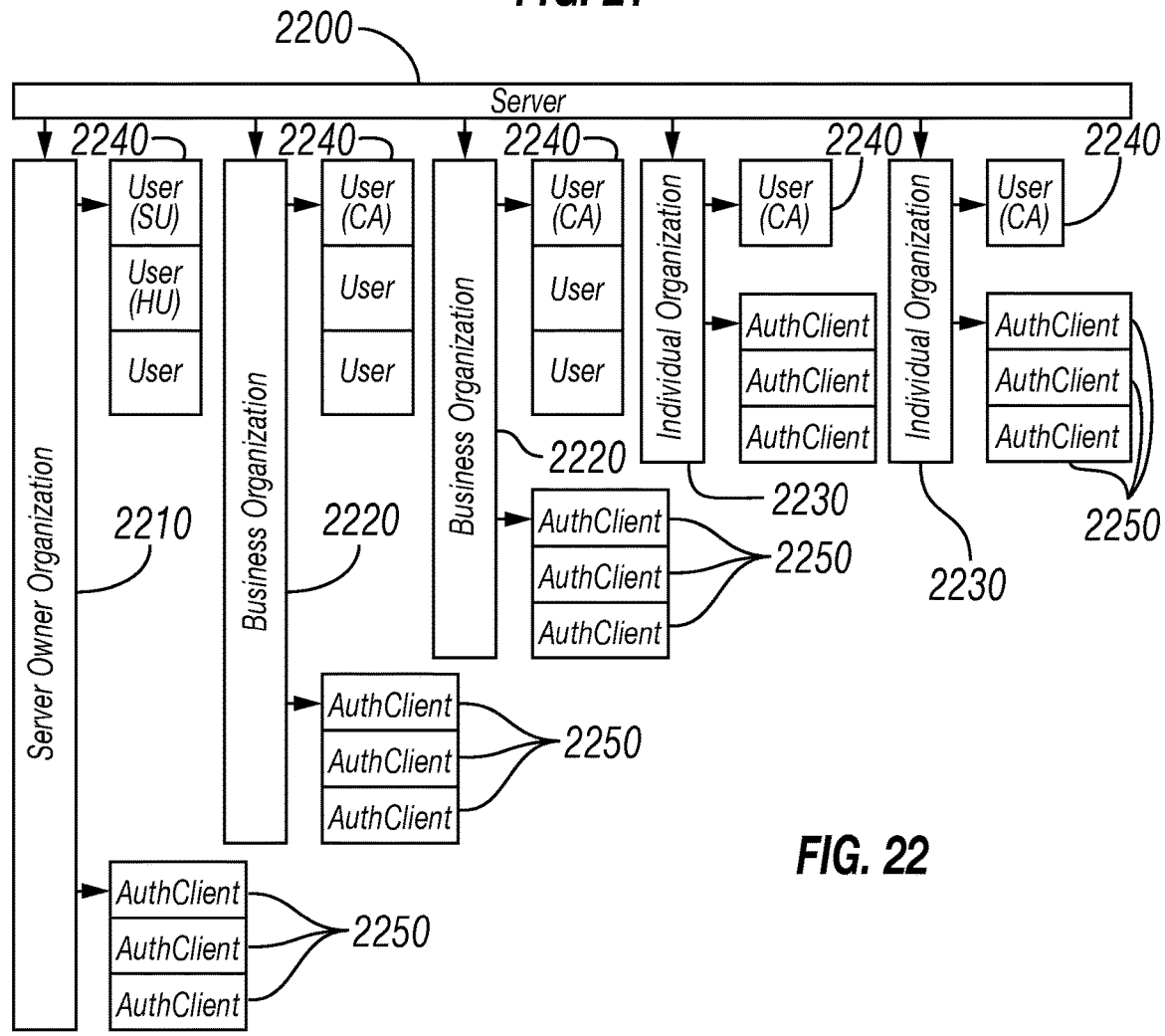
FIG. 22 depicts a schematic illustrating a visualization of a data model of a system according to some embodiments of the disclosure.

FIG. 22 illustrates a visualization of a data model of a system according to some configurations disclosed herein. The data model implements a hierarchy that is anchored at the top by a server data model 2200. This data model for the server can include data specific about the installation of a given server. This data may include the URL at which the server is installed, the name of the server, the time zone the server is residing in, information on the user that installed the server and who acts as the Super Administrator User for the server, etc.

The server data model 2200 may include links to an organization data model that defines the organization that owns and installed the server (i.e. Server Owner Organization data model 2210). In addition, the server can implement multi-organization tenancy by including links to additional organizational models that define either a business organization (business organization data model 2220) or an individual organization (individual organization data model 2230). An organization model will contain information about an organization whose users and applications will interface with the OmniDefend server for authentication, authorization and identity.

For example, an organization model may have information about the organization name, organization addresses, organization main business website URL, organization telephone numbers, organization divisions and departments, etc.). In the case of an individual organization, the organization data model 2230 may contain limited data which is similar to the information of the user himself. A business organization data model 2220 may contain links to one or more user data models 2240 which represents a user in the organization. An individual organization data model 2230 will contain only one user data model 2240 that represents the specific individual.

Although two business organization data models and two individual organization data models are shown as an example, there may be different numbers of data models stored in the database. As mentioned above, an organization model may contain links to one or more user data models 2240 depending on the type of the organization (business or individual). The user data model 2240 may store authentication, authorization and identity information about the user such as the user's name, addresses, telephone numbers, date of birth, authentication templates (e.g. fingerprint template), public and private cryptographic keysets, and role information for a given application. Every organization model may have links to AuthClient models 2250 that represent websites or applications that, at the direction/instruction/request of the specific organization will interface to the OmniDefend server for user authentication, authorization and identity operations.

Figure 25:
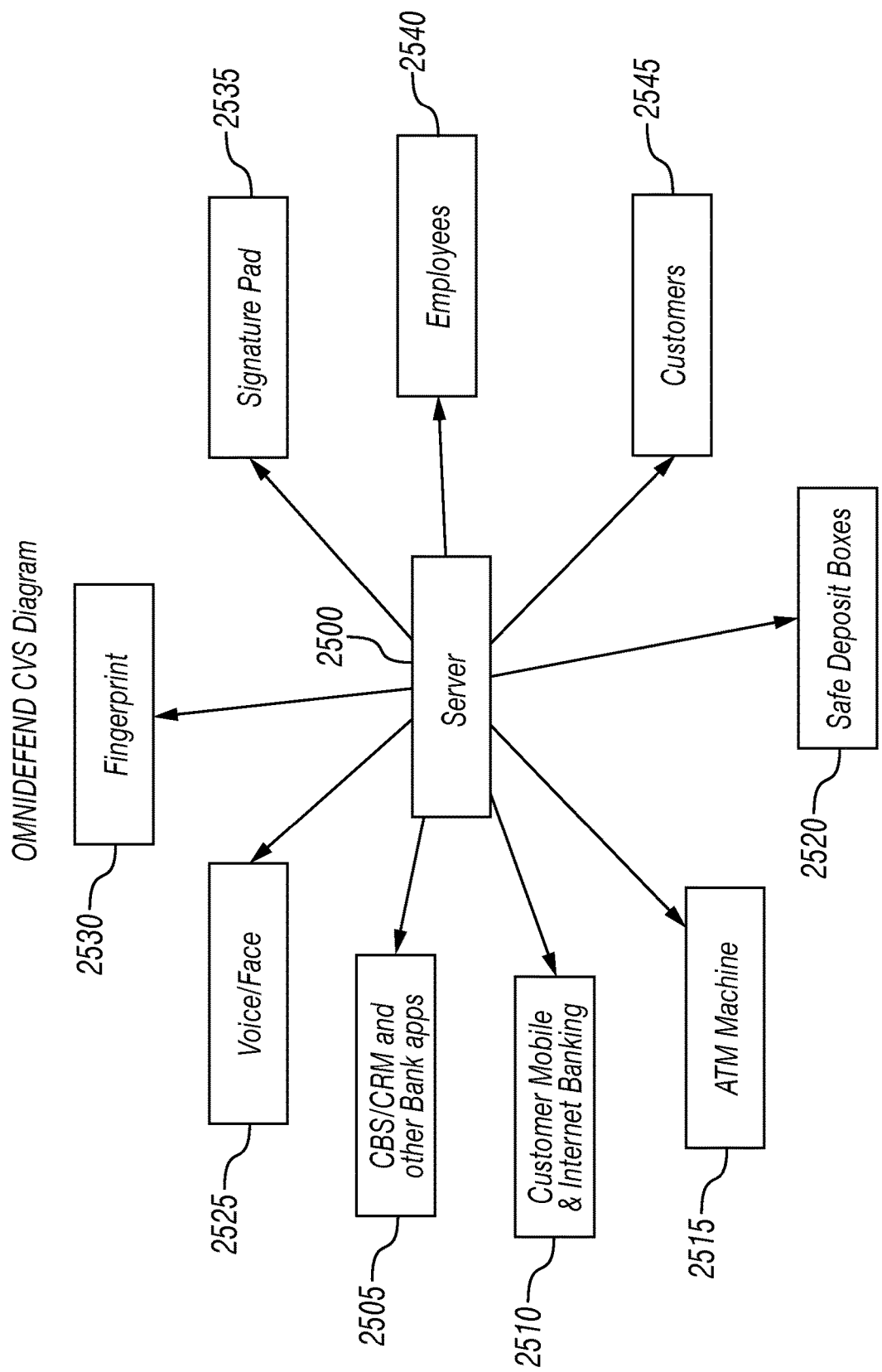
FIG. 25 is a schematic illustrating how websites and applications in an organization can interface to a server for authentication, according to some embodiments of the disclosure.

FIG. 25 illustrates how websites and applications in an organization can interface to the OmniDefend server for authentication. The OmniDefend server 2500 represents a server that could be hosted in a data center, or as a public website, or as a private server on the premises of an organization. This OmniDefend server 2500 may be used by multiple organizations and may contain multiple organization data models such as those shown in FIG. 22. (In FIG. 25, only a single organization is represented, as described below.) For a given organization, there may be multiple AuthClient models 2250 as shown in FIG. 22. Each AuthClient model 2250 would represent an application or website as shown in FIG. 25. For example, where the organization is a bank, the bank may have multiple applications such as core banking system (CBS)/CRM and other bank apps 2505, customer mobile or internet website 2510, ATM machine 2515, safe deposit box access 2520, etc. The bank may use the OmniDefend server 2500 to authenticate users (both employees and customers) into their applications. The bank may have multiple applications or websites such as the core banking system 2505 which would require employee authentication for login, customer facing mobile or internet banking website 2510 at which customers could authenticate to login, ATM machine 2515 where customers or employees could authenticate to bring up their accounts or do management, and safe deposit boxes 2520 where the customers may need to authenticate for access to the box. Each of these applications may be defined in the server 2500 by the AuthClient model 2250 under the given bank organization.

Because of the data model hierarchy, the AuthClient could be setup to limit authentication to users whose user data model (e.g., 2240) is under the same organization (e.g., 2220) as is the AuthClient data model (e.g., 2250). In that way, a bank website may be able to authenticate only those users belonging to that specific bank. The AuthClient can be configured to allow user authentication with one of the defined authentication technologies such as voice/face 2525, fingerprint 2530, signature pad 2535, etc.]. When the authentication is completed, the user model information 2240 may be retrieved for the authenticated user. This user can be an employee 2540 or a customer 2545 and can have a specific authorization role in the organization as defined by the user model (e.g. 2240). For example, if the core banking application AuthClient is requesting authentication, then when the user authenticates using their fingerprint, the user model (e.g. 2240) will be retrieved and if the user is not an employee 2540 or a customer 2545 the login can be rejected.

If, for example, the user is an employee 2540, his authorization role can be sent to the core banking application so that the application knows what functionalities to enable in the applications (e.g. whether to enable teller functions only or also to enable the manager functions as well). In addition, the user identity information can be sent back to the core banking application, so the application knows the name and other information about the employee 2540 or customer 2545 that is logging in.

The following is an overview of OmniDefend APIs. The Server Controller may employ the following APIs, which perform the indicated functions:

Https://<server>/core/v1/server/{serverId}—server functions; HTTP POST (create server), HTTP GET (get server information), HTTP PUT/PATCH (modify server info), HTTP Delete NotImpl (CRU)

https://<server>/core/v1/server/database—database setup functions; (C)

The Organization Controller may employ the following APIs, which perform the indicated functions:

Https://<server>/core/v1/organization/{orgId}—organization function; (CRUD)

Https://<server>/core/v1/organization/{orgId}/authClients/{authClientId}—authentication client functions; (CRUD)

The Users Controller may employ the following APIs, which perform the indicated functions:

Https://<server>/scim/v2/users/{userId}—SCIM 2.0 user function; (CRUD)

Https://<server>/core/v1/users/{userId}/ConfirmAccount—function to confirm a user's account Https://<server>/core/v1/users/{userId}/ResetPassword—function to reset a user's password Https://<server>/core/v1/users/{userId}/ChangePassword—function to change a user's password Https://<server>/core/v1/users/{userId}/ExternalProviders (+/link and/unlink)—functions to link a user's account to an external authentication provider like Facebook, Google, or LinkedIn The Auth Controller may employ the following APIs, which perform the indicated functions:

Https://<server>/core/v1/auth/login (+?idp=<external provider>)—function to login user, returns access token for all other APIs https://<server>/core/v1/auth/logout—function to logout a user by revoking the access tokens for a user https://<server>/core/v1/auth/token—function to get authCode, idToken and refresh token for a user https://<server>/core/v1/auth/token/refresh—function to refresh an auth token using the refresh token There may also be a Role Controller, which may employ various APIs. The APIs may be either authenticated or un-authenticated. Authenticated APIs may be designed such that they are required to pass a valid access token (received after user login), otherwise the API will fail. For example, if a user is logged in, only then will the Organization controller APIs work. Unauthenticated APIs (such as create server or login user) don't require an access token.

APIs are called after setting special headers in the HTTP Request. In this regard the system may be designed so that OD-client-id/OD-client-secret must be set to represent a valid client application that can call the APIs, and so that other headers have to be set based on the API. There may also be a Groups Controller, which may employ various APIs, e.g., SCIM 2.0 api. There may also be a Licensing Controller, which may employ various APIs.

Figure 23:
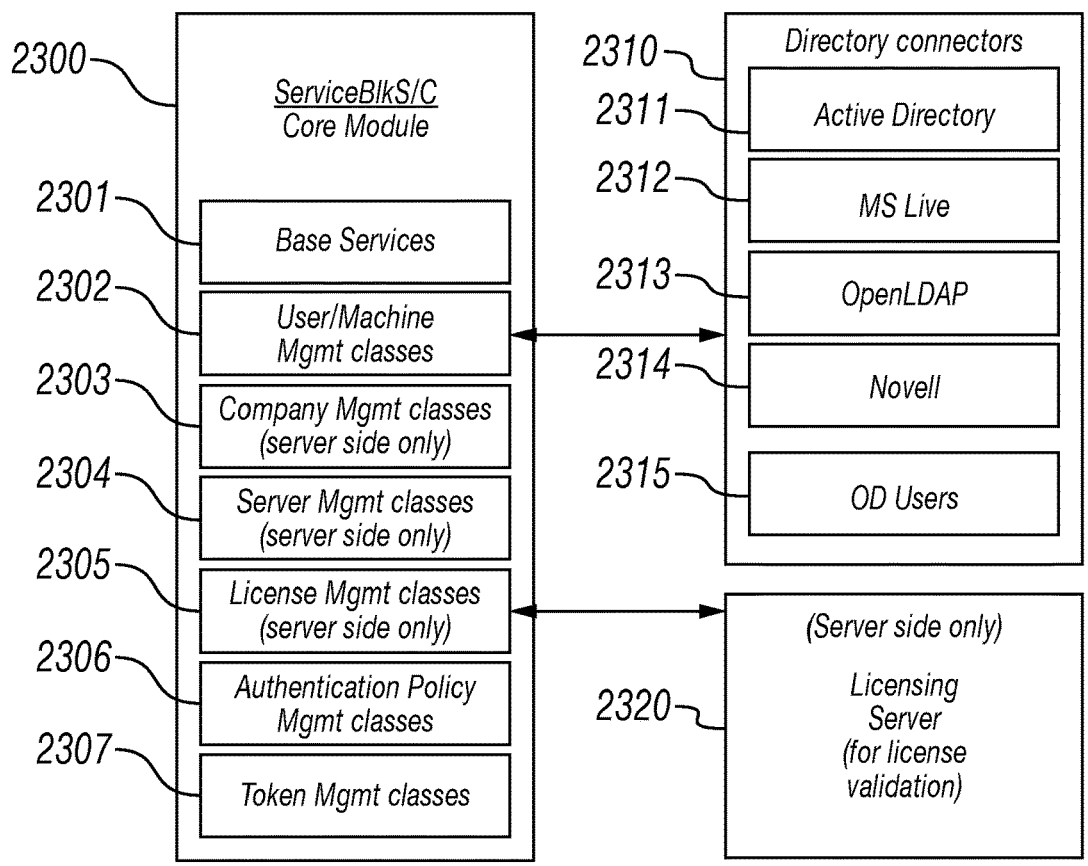
FIG. 23 depicts a schematic illustrating further detail of a system according to some embodiments of the disclosure.
Figure 24:
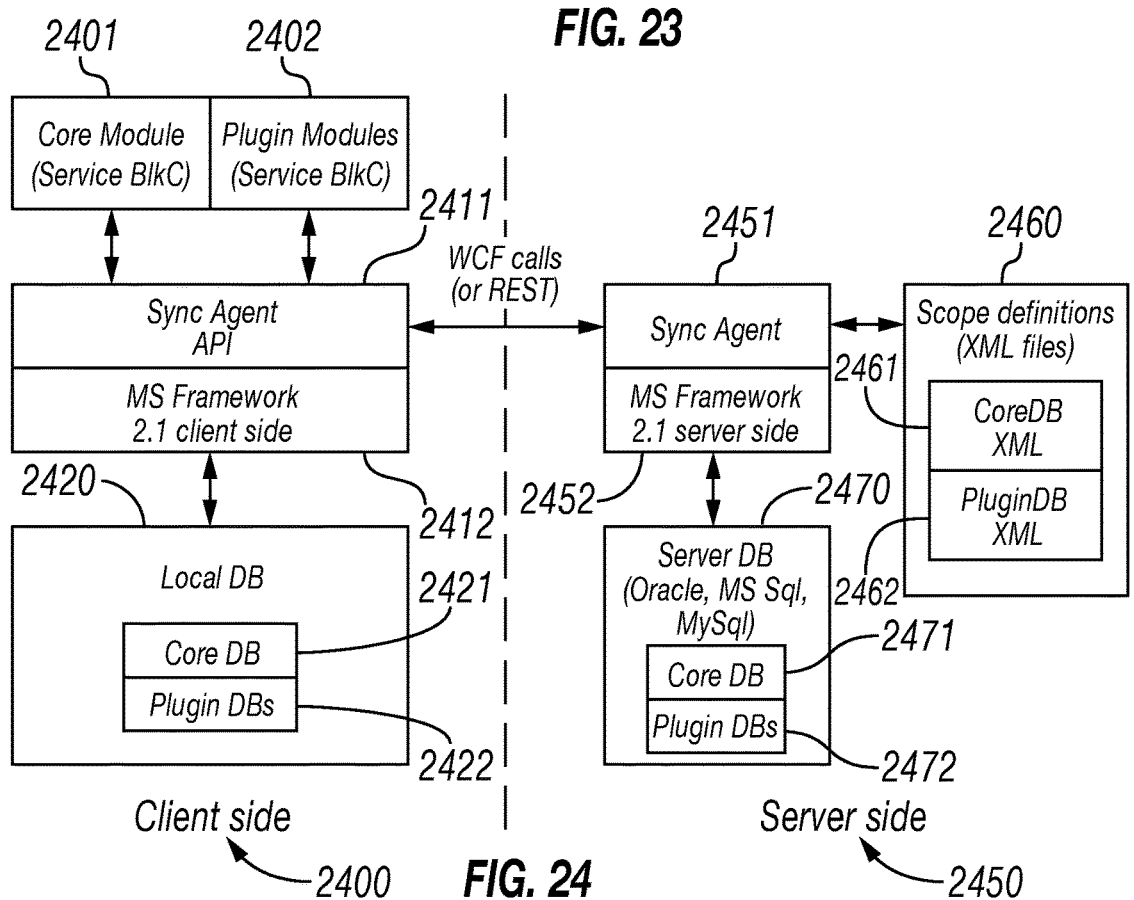
FIG. 24 depicts a schematic illustrating further detail of a system according to some embodiments of the disclosure.

FIGS. 23 and 24 are schematics illustrating further details of an example OmniDefend system such as that illustrated in FIG. 3, including what may be referred to as the Core Package of OmniDefend. As illustrated in FIG. 23, ServiceBlkS/C Core Module 2300 may interact with Directory Connectors 2310 and Licensing Server 2320 (server side only). ServiceBlkS/C Core Module 2300 may include Base Services 2301, User/Machine Management classes 2302, Company Management classes 2303 (server side only), Server Management classes 2304 (server side only), License Management classes 2305 (server side only), Authentication Policy Management classes 2306, and Token Management classes 2307.

Base Services 2301 may include ServiceBlk plugin loaders, database connectors, services routing, etc. User/Machine Management classes 2302 provide for integration with AD (including groups) and are extendable to other directories. Token Management classes 2307 are used to secure API calls—this ensures that only authorized modules can call APIs.

Directory Connectors 2310 may include Active Directory 2311, MS Live 2312, OpenLDAP 2313, Novell 2314, and OD Users 2315. On the server side only, Licensing Server 2320 may be provided, for license validation.

FIG. 24 shows a more detailed view of certain components of an OmniDefend System: On the client side 2400, FIG. 24 illustrates Core Module (ServiceBlkC) 2401, Plugin Modules (ServiceBlkC) 2402, Sync Agent API 2411, MS Framework 2.1 client side 2412, and Local Database 2420 including Core Database 2421 and Plugin Databases 2422. On the server side 2450, FIG. 24 illustrates Sync Agent 2451, MS Framework 2.1 sever side 2452, Scope definitions (XML files) 2460 including CoreDB XML 2461 and PluginDB XML 2462, and Server Database 2470 including Core Database 2471 and Plugin Databases 2472. The arrows indicate interactions between the various components.

SyncAgents 2411 and 2451 allow for syncing of database context (tables and fields) from server to client. The syncing can use a synchronization framework such as the MICROSOFT® Sync Framework 2.1, which provides for standardized code and mitigates sync issues. The plugin modules provide simple XML files to define the tables/fields to be synced to the client (called the "sync scope"). The sync scope can be filtered on any field, such as a userid, machineid, etc., so that a client system only has data relevant to the user(s)/machine that are cached on that system. The SyncAgent will provide an API so plugins can schedule their individual sync interval. Syncing is over WCF or REST.

As part of this example, further description is provided with reference to FIG. 3. AuthBlk (Client Side) 130 may include Base Services, which may include Authentication plugin loaders, etc.; a Master Password Authentication plugin; a PIN Authentication plugin; active temporary library (ATL) COM service (for functionality); and a user mode ATL COM module (for user interface from authentication devices).

Control Panel UI (Client Side) 120 may include Base services and a Core UI 121. Base services may include a loader for other plugin UI components. Core UI 121 may be able to display information in a control panel type user interface on the client and may be able to show any core data which could include user, organization, role or authentication information.

With regard to the Functional Components (Client Side) 110, Credential Provider 111 will call AuthBlk 130 for authentication. AuthBlk 130 may be provided with Master Password (MP) and PIN as default functionality. It is also possible to change MP support. Credential Provider 111 is an optional install and if desired may be omitted from configurations of the OmniDefend system.

With regard to Webpages (Server) 310, Core UI 311 may set up server, create users and company, mange base policies, etc. Core UI 311 may be customizable for different flavors of OmniDefend (e.g., OmniDefend for Websites and OmniDefend for Business).

With regard to Plugins, there are two types: Functional Modules (e.g., SSO, SED, FIDO, etc.) and Authentication device plugins.

The Functional Modules may be characterized as follows:
- Include all components (both server and client side) to make the specific function work (e.g., SSO plugin may include server side ServiceBlkS component, along with client side ServiceBlkC+browser BHO and application dialog SSO service).
- Separate installer—for installing functional components; should be lightweight (downloadable to client)
- Maintains own database context on both client and server side. DB context can be set to sync regularly based on filtered parameters (optional)
- Can provide ServiceBlk API (exported APIs) (COM on client, .NET classes and/or REST APIs for internal/external usage (including server web pages) for other modules to call into plugin
- Can consume exported APIs from other modules (specifically Core)
- Creates own custom database schema/context (custom tables and fields for the data the plugin needs to store. DB Tables/fields are all defined directly in code and uses MS Entity Framework 6 Code First design
- Defines Sync Scope XML file so that SyncAgent knows what tables/fields to sync between server and client
- Maintains and exports custom logging (including webpages UI, REST APIs/.NET classes for logging, DB tables/fields for log data). This is because logging data is unique per functional module
- Minimal fixed APIs that must be implemented—only those required/defined to allow modules to be loaded, etc.

The AuthBlk plugins may be characterized as follows:
- Will provide 2 components, one for UI that is run in user context and one for auth functionality of the plugin that will run in ATL service (one instance per system talking to h/w)
- Auth plugins API will be designed to sign a challenge from calling module (AuthBlk) in order to validate user identity. Similar to FIDO UAF authentication model.
- Auto detection and loading support is employed so that all supported auth plugins can be installed on a system—no need for custom installation packages with the right plugins.

OmniDefend for Websites flavor may be employed for website providers that want to add FIDO® authentication to their login allowing customers to have an integrated SSO experience and removing the risk of storing passwords on the website. This flavor of OmniDefend may include Core Modules+FIDO Plugin.

OmniDefend for Business flavor may be employed for enterprise customers that want to secure their endpoints with strong authentication, SSO, SED management, anti-theft, and port management. This flavor of OmniDefend may include Core Modules+SSO/SED/AT/Port Management plugins.

With high dollar investment in high tech security industries, these IAM solutions may provide the necessary software, hardware and security services to identify employees, customers, and partners electronically; providing on-demand, on-device access to digital information and transactions, as well as protecting customer communications.

This reflects the pivotal role of IAM solutions in the high tech security industry where the ability to establish and verify the identities of customers and employees, as well as ensure the security of their transactions, is fundamental to maintaining customer trust. As a result, banks are starting to re-evaluate their role in the identity supply chain. At a time when industry convergence and disruptive innovation around payments and commercial services are so intense, this becomes a high priority.

High tech security Industries are looking to seize far broader business benefits by exploiting new identity solutions, including biometrics and advanced analytics technologies, to reduce fraud, waste and abuse. This may enhance the overall security of the organization, and increase customer loyalty, retention and satisfaction.

Challenges facing the high tech security industries include: retaining existing customers and acquiring new customers; eliminating fraud and reduce the risk of breaches; requiring more IT control over the customer's accounts; wanting easier ways to manage employees and customer's records; employing more state-of-the-art security technologies; adapting to the latest technology in the high tech security sector; and having a centralized database that can access and manage both customers and employees.

Employing OmniDefend for BFSI may profitably acquire new customers and retain existing ones; increase customer satisfaction by allowing customers to sign into their accounts just with a finger swipe or a palm touch; minimize employee sign-in time by enabling single sign-on to multiple accounts with a single biometric authentication; permit IT to manage all customers and tellers from a single console and dashboard; detect fraud and reduce charge-offs; introduce additional authentication procedures, such as knowledge-based authentication questions for the riskiest applicants or transactions; and meet compliance due-diligence requirements during application and account management processes Features of OmniDefend include:
- OmniDefend CVS can be deployed as a standalone solution or can be integrated into a bank's Core Banking Application
- A multi-faceted, standards-compliant Identity Management Solution designed to deliver identification requests and authentications over large databases of 1,000,000,000+ users
- Services many Banking and Financial verticals markets as well as Government, HealthCare and Corporate
- Supports numerous biometric devices and technologies such as palm vein scanners, facial, tokens, etc.

State-of-the-art biometric algorithm to identify duplicate fingerprints in large scale biometric database, resulting in high level fingerprint matching performance without any loss of accuracy Can be accessed via public cloud or deployed on-premise private cloud Supports Automated Fingerprint Identification System (AFIS)

Simple user interface to manage employees and customer log-ins

Easy to learn for both customers and employees

Supports all hardware platforms and common operating systems such as Windows and Unix/Linux Supports standard databases such as ORACLE®, SQL, MySQL Highly-customizable architecture providing customers "best fit solutions" to address their needs With OmniDefend CVS, high tech security institutions may be able to address many of the cybersecurity issues facing the high tech security industry today, such as data breaches and identity fraud.

The OmniDefend CVS may also enable high tech security businesses to provide additional value to their customers by enhancing and simplifying the customer verification process. Customers will be able to quickly and easily sign in to their accounts with their fingerprint or palm prints, eliminating the need to provide identification or account information to carry out banking transactions.

The OmniDefend CVS is simple to learn and easy to set up and deploy. OmniDefend may increase overall security while enhancing the banking experience of customers.

To eliminate fraud, OmniDefend provides a cloud-based customer and employee management system to eliminate fraudulent transactions through biometric authentication. For secure banking, OmniDefend manages both customer verifications and employee sign-ins from a single console, allow employees to sign-in to all of their accounts without passwords, supports many different biometric technologies using state-of-the-art matching algorithms, may be deployed as a stand-alone solution or integrated into core (e.g., banking) applications, is simple and secure, and quickly and easily meets compliance. To retain customers, OmniDefend enables banks and other entities to provide additional value to their customers by enhancing and simplifying the customer verification process, and enables customers to quickly verify their identity and carry out secure transactions through biometric authentication. OmniDefend provides customer verification, financial inclusion, and biometric-enabled KYC. OmniDefend addresses and mitigates stolen checks, forged or altered checks, accounting fraud, rogue transactions, fraudulent loan applications, and forged documents.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ."

Also, the term "couple" or "linked" is intended to mean either an indirect or direct connection. Thus, if a first device links or couples to a second device, that connection may be through a direct connection, or through an indirect connection via other devices and connections. As used herein, the terms "user", "customer", "client", and "authentication subject" are used interchangeably and should be interpreted to mean an individual and/or an entity (e.g. a website, a computer), unless expressly stated otherwise. As used herein, the term "software portal" should be interpreted to mean a access point to a software application (e.g. a webpage login screen). Also as used herein, the term "mobile device" should be interpreted to include a smart tablet, a cell phone, or any other conventional portable electronic communication device. As used herein, any reference to a "fingerprint reader" should be interpreted to generally encompass a conventional authentication device that can be used to authenticate a person or other device via means as known in the art (i.e., not to be limited solely to a fingerprint reading device). For example, but not by way of limitation, any reference to a "fingerprint reader" should be interpreted to encompass an authentication device that can be used to authenticate a user via a fingerprint, a retinal scan, a mobile device acknowledgement, etc.

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. Relatedly, certain features may be omitted in certain figures, and this may not be explicitly noted in all cases.

While various embodiments are described herein, it should be appreciated that the present invention encompasses many inventive concepts that may be embodied in a wide variety of contexts. Thus, the following detailed description of exemplary embodiments, read in conjunction with the accompanying drawings, is merely illustrative and is not to be taken as limiting the scope of the invention. Rather, the scope of the invention is defined by the appended claims and equivalents thereof.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise or so dictated by the description herein.

Similarly, although example methods or processes have been described with regard to particular steps or operations performed in a particular sequence, numerous modifications could be applied to those methods or processes to derive numerous alternative embodiments of the present invention. For example, alternative embodiments may include methods or processes that use fewer than all of the disclosed steps or operations, methods or processes that use additional steps or operations, and methods or processes in which the individual steps or operations disclosed herein are combined, subdivided, rearranged, or otherwise altered. Similarly, this disclosure describes one or more embodiments wherein various operations are performed by certain systems, applications, module, components, etc. In alternative embodiments, however, those operations could be performed by different components.

Illustrative embodiments of the invention are described below. In the interest of clarity, not all features of an actual implementation are necessarily described for each embodiment disclosed in this specification. In the development of any such actual embodiment, numerous implementation-specific decisions must be made to achieve the design-specific goals, which will vary from one implementation to another. It will be appreciated that such a development effort, while possibly complex and time-consuming, would nevertheless be a routine undertaking for persons of ordinary skill in the art having the benefit of this disclosure.

The above description is illustrative of the preferred embodiment and many modifications may be made by those skilled in the art without departing from the disclosure whose scope is to be determined from the literal and equivalent scope of the claims that follow.

While the embodiments are described with reference to various implementations and exploitations, it will be understood that these embodiments are illustrative and that the scope of the inventive subject matter is not limited to them. Many variations, modifications, additions and improvements are possible, such as various combinations of the features and/or methods described herein.

This disclosure may include descriptions of various benefits and advantages that may be provided by various embodiments. One, some, all, or different benefits or advantages may be provided by different embodiments.

Embodiments of the invention may be implemented with conventional computers and mobile devices configured with the software to carry out the disclosed techniques. This disclosure describes one or more embodiments wherein various operations are performed by certain systems, applications, modules, or components. In alternative embodiments, however, those operations could be performed by different components. Similarly, items such as applications, modules, components, etc., may be implemented as software constructs stored in a machine accessible storage medium, such as an optical disk, a hard disk drive, etc., and those constructs may take the form of applications, programs, subroutines, instructions, or any other suitable form of control logic; such items may also be implemented as firmware or hardware, or as any combination of software, firmware and hardware. The term "processor" may refer to one or more processors. It will be appreciated by those skilled in the art that embodiments of the invention may be implemented for applications using any conventional, or yet to be developed, computer architectures, platforms, or operating systems (e.g., WINDOWS®, IOS®, ANDROID®, MACOS®, LINUX®, SOLARIS®, AMIGAOS®, etc.).

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

The invention claimed is:

1. An integrated cybersecurity system for providing restricted client access to a website, comprising:
   a security database communicatively coupled to a client device via a client communication link to pass client data therebetween, the security database communicatively coupled to the website via a website communication link to pass secure information therebetween, the client device communicatively coupled to authentication hardware to receive client input from a client, the client data comprising the client input and client enrollment information, the secure information comprising information from or associated with the client data; and
   a gateway comprising a user interface accessible by a gateway operator to configure client settings, a website module accessible by a website operator to configure website settings, and a services module that works in concert with the user interface, the website module, and the security database to send integrated client confirmation to the website, wherein the integrated client confirmation comprises authentication, authorization, and identification of the client, whereby the website permits selective access to the website by the client based at least on the website being sent the authorization in the integrated client confirmation.

2. The integrated cybersecurity system of claim 1, further comprising a matcher configured to create a template based on client enrollment or authentication information and to ascertain whether a match exists between the template created based on the client enrollment or the authentication information and another template stored in the security database.

3. The integrated cybersecurity system of claim 1, wherein the gateway is configured to:
   receive an authentication request from the website;
   locate the client in the security database;
   redirect the client device to an authentication screen;
   receive a capture template from the client device;
   attempt to match the capture template with an enrollment template in a client data library in the security database; and
   upon determination of a match result, send the match result to the website to confirm authentication of the client device.

4. The integrated cybersecurity system of claim 3, wherein the capture template is created based on the confirmation of an identity of the client, the confirmation performed locally at the client device.

5. The integrated cybersecurity system of claim 1, wherein the gateway is configured to:
   in response to an enrollment or authentication request from the website, consult the security database and send secure information to the website; and
   in response to receipt of client enrollment or authentication information, process the authentication information and send a confirmation response to the website.

6. The integrated cybersecurity system of claim 5, wherein the security database stores a plurality of templates, and processing the authentication information comprises:
   creating a client template from the client enrollment or the authentication information; and
   searching the security database to find a match with one of the plurality of templates stored therein.

7. The integrated cybersecurity system of claim 5, wherein the gateway is further configured to:
   redirect a browser on the client device to an enrollment webpage specific to the client device attempting enrollment or authentication.

8. The integrated cybersecurity system of claim 5, wherein the gateway is configured to perform authentication as a background operation without being displayed on a user interface.

* * * * *